(12) United States Patent
Nitta et al.

(10) Patent No.: US 10,977,282 B2
(45) Date of Patent: Apr. 13, 2021

(54) GENERATING DEVICE, GENERATING METHOD, AND NON-TRANSITORY COMPUTER-READABLE RECORDING MEDIUM

(71) Applicant: YAHOO JAPAN CORPORATION, Tokyo (JP)

(72) Inventors: Kiyoshi Nitta, Tokyo (JP); Iztok Savnik, Koper (SI)

(73) Assignee: YAHOO JAPAN CORPORATION, Tokyo (JP)

(*) Notice: Subject to any disclaimer, the term of this patent is extended or adjusted under 35 U.S.C. 154(b) by 398 days.

(21) Appl. No.: 15/690,997

(22) Filed: Aug. 30, 2017

(65) Prior Publication Data

US 2018/0144043 A1    May 24, 2018

(30) Foreign Application Priority Data

Nov. 24, 2016 (JP) .............................. JP2016-228218

(51) Int. Cl.
*G06F 7/00* (2006.01)
*G06F 16/28* (2019.01)
*G06F 16/901* (2019.01)
*G06F 16/35* (2019.01)

(52) U.S. Cl.
CPC .......... *G06F 16/285* (2019.01); *G06F 16/288* (2019.01); *G06F 16/35* (2019.01); *G06F 16/9024* (2019.01)

(58) Field of Classification Search
CPC .... G06F 16/285; G06F 16/35; G06F 16/9024; G06F 16/288; G06F 16/2428; G06F 16/7335; G06F 16/784

USPC ................................ 707/738, 710, 737, 771
See application file for complete search history.

(56) References Cited

U.S. PATENT DOCUMENTS

| 6,735,593 | B1* | 5/2004 | Williams | G06F 16/288 |
| 8,037,108 | B1* | 10/2011 | Chang | G06F 16/258 |
| | | | | 707/803 |
| 8,315,998 | B1* | 11/2012 | Dean | G06F 16/951 |
| | | | | 707/705 |
| 8,572,059 | B2* | 10/2013 | Britton | H04L 67/42 |
| | | | | 707/705 |
| 8,631,048 | B1* | 1/2014 | Davis | G06F 16/211 |
| | | | | 707/803 |

(Continued)

FOREIGN PATENT DOCUMENTS

JP         2013-175181 A     9/2013

OTHER PUBLICATIONS

Dec. 26, 2017 Office Action issued in Japanese Patent Application No. 2016-228218.

(Continued)

*Primary Examiner* — Mohammed R Uddin
(74) *Attorney, Agent, or Firm* — Oliff PLC

(57) ABSTRACT

A creating device according to the present application includes an acquiring unit, and a creating unit. The acquiring unit acquires a plurality of pieces of triple information indicating a relationship related to three types of elements. The creating unit creates, from among the pieces of the triple information acquired by the acquiring unit, association information that associates a triple information group having a predetermined relationship related to the three types of elements.

9 Claims, 14 Drawing Sheets

(56) References Cited

U.S. PATENT DOCUMENTS

| | | | |
|---|---|---|---|
| 8,793,273 B1* | 7/2014 | Sadovsky | G06F 8/427 |
| | | | 707/769 |
| 9,342,800 B2* | 5/2016 | Allerton | G06Q 10/00 |
| 9,396,283 B2* | 7/2016 | Miranker | G06F 16/90332 |
| 9,576,007 B1* | 2/2017 | Sivathanu | G06F 16/282 |
| 10,055,450 B1* | 8/2018 | Tansel | G06F 16/24 |
| 10,437,804 B1* | 10/2019 | Tsypliaev | G06F 16/9024 |
| 2003/0158841 A1* | 8/2003 | Britton | G06F 16/90335 |
| 2003/0208499 A1* | 11/2003 | Bigwood | G06F 16/34 |
| 2004/0054690 A1* | 3/2004 | Hillerbrand | G06Q 10/06 |
| 2005/0182752 A1* | 8/2005 | Rojer | G06F 16/284 |
| 2006/0235837 A1* | 10/2006 | Chong | G06F 16/24534 |
| 2008/0243770 A1* | 10/2008 | Aasman | G06F 16/28 |
| 2008/0294644 A1* | 11/2008 | Liu | G06F 16/335 |
| 2009/0012842 A1* | 1/2009 | Srinivasan | G06F 16/3344 |
| | | | 705/12 |
| 2009/0138437 A1* | 5/2009 | Krishnamoorthy | G06F 16/24534 |
| 2009/0138498 A1* | 5/2009 | Krishnamoorthy | G06F 16/24534 |
| 2009/0265686 A1* | 10/2009 | Lucas | G06F 9/4494 |
| | | | 717/120 |
| 2009/0313270 A1* | 12/2009 | Aust | G06F 16/288 |
| 2010/0241644 A1* | 9/2010 | Jackson | G06F 16/2423 |
| | | | 707/760 |
| 2011/0082829 A1* | 4/2011 | Kolovski | G06F 16/367 |
| | | | 706/55 |
| 2011/0202534 A1* | 8/2011 | Allerton | G06Q 10/00 |
| | | | 707/738 |
| 2011/0209138 A1* | 8/2011 | Monteith | G06F 16/2246 |
| | | | 717/172 |
| 2011/0225167 A1* | 9/2011 | Bhattacharjee | G06F 16/284 |
| | | | 707/747 |
| 2011/0246407 A1* | 10/2011 | Lee | G06N 5/04 |
| | | | 706/47 |
| 2012/0310916 A1* | 12/2012 | Abadi | G06F 16/2456 |
| | | | 707/713 |
| 2013/0036117 A1* | 2/2013 | Fisher | G06F 16/487 |
| | | | 707/736 |
| 2013/0238667 A1* | 9/2013 | Carvalho | G06F 16/27 |
| | | | 707/798 |
| 2014/0172914 A1* | 6/2014 | Elnikety | G06F 16/9024 |
| | | | 707/774 |
| 2014/0244657 A1* | 8/2014 | Mizell | G06F 16/9024 |
| | | | 707/743 |
| 2014/0278343 A1* | 9/2014 | Tran | G06F 17/2785 |
| | | | 704/2 |
| 2015/0012561 A1* | 1/2015 | Kirchoff | G06F 16/258 |
| | | | 707/769 |
| 2015/0095278 A1* | 4/2015 | Flinn | G06N 7/005 |
| | | | 706/52 |
| 2015/0100568 A1* | 4/2015 | Golden | G06N 5/02 |
| | | | 707/722 |
| 2015/0234936 A1* | 8/2015 | Hu | G06N 5/02 |
| | | | 707/798 |
| 2015/0248478 A1* | 9/2015 | Skupin | G06F 16/367 |
| | | | 707/609 |
| 2015/0339379 A1* | 11/2015 | Inagaki | G06F 16/34 |
| | | | 707/776 |
| 2016/0224637 A1* | 8/2016 | Sukumar | G06F 16/951 |
| 2016/0328467 A1* | 11/2016 | Zou | G06F 17/2735 |
| 2017/0068748 A1* | 3/2017 | Hu | G06F 16/9024 |
| 2018/0039695 A1* | 2/2018 | Chalabi | G06N 5/022 |

OTHER PUBLICATIONS

Suzuki, Daichi et al.; "Building and Evaluation of RDF Store Using Distributed Key-Value Database"; papers for the Forum of the fourth Data Engineering and Information Management Japan; the Institute of Electronics, Information and Communication Engineers, Data Engineering Event Stream; the Database Society of Japan, Information Processing Society of Japan; Database System; Workshop, pp. 1 to 8, Aug. 30, 2012.

Mar. 31, 2020 Office Action issued in Japanese Patent Application No. 2018-020621.

* cited by examiner

FIG.4

| ID | Subject | Predicate | Object | iS | iP | iO | iSP | iSO | iPO |
|---|---|---|---|---|---|---|---|---|---|
| 0 | <philosopher> | rdfs:subClassOf | <person> | 0 | 1 | 1 | 0 | 0 | 1 |
| 1 | <scientist> | rdfs:subClassOf | <person> | 1 | 0 | 0 | 1 | 1 | 0 |
| 2 | <Plato> | rdf:type | <philosopher> | 11 | 8 | 3 | 2 | 2 | 3 |
| 3 | <Leibniz> | rdf:type | <philosopher> | 14 | 2 | 2 | 4 | 3 | 2 |
| 4 | <Leibniz> | rdf:type | <scientist> | 3 | 3 | 5 | 3 | 4 | 5 |
| 5 | <Goedel> | rdf:type | <scientist> | 15 | 4 | 4 | 5 | 5 | 4 |
| 6 | <Athens> | rdf:type | <location> | 6 | 5 | 8 | 6 | 6 | 8 |
| 7 | <Leipzig> | rdf:type | <location> | 7 | 6 | 6 | 7 | 7 | 6 |
| 8 | <Brno> | rdf:type | <location> | 8 | 7 | 7 | 8 | 8 | 7 |
| 9 | <Plato> | <wasBornIn> | <Athens> | 2 | 15 | 9 | 9 | 9 | 9 |
| 10 | <Plato> | <influences> | <Leibniz> | 9 | 13 | 10 | 10 | 10 | 10 |
| 11 | <Plato> | <hasAge> | 2500 | 10 | 14 | 11 | 11 | 11 | 11 |
| 12 | <Leibniz> | <wasBornIn> | <Leipzig> | 4 | 9 | 12 | 12 | 12 | 12 |
| 13 | <Leibniz> | <influences> | <Goedel> | 12 | 10 | 13 | 13 | 13 | 13 |
| 14 | <Leibniz> | <hasAge> | 500 | 13 | 11 | 14 | 14 | 14 | 14 |
| 15 | <Goedel> | <wasBornIn> | <Brno> | 5 | 12 | 15 | 15 | 15 | 15 |

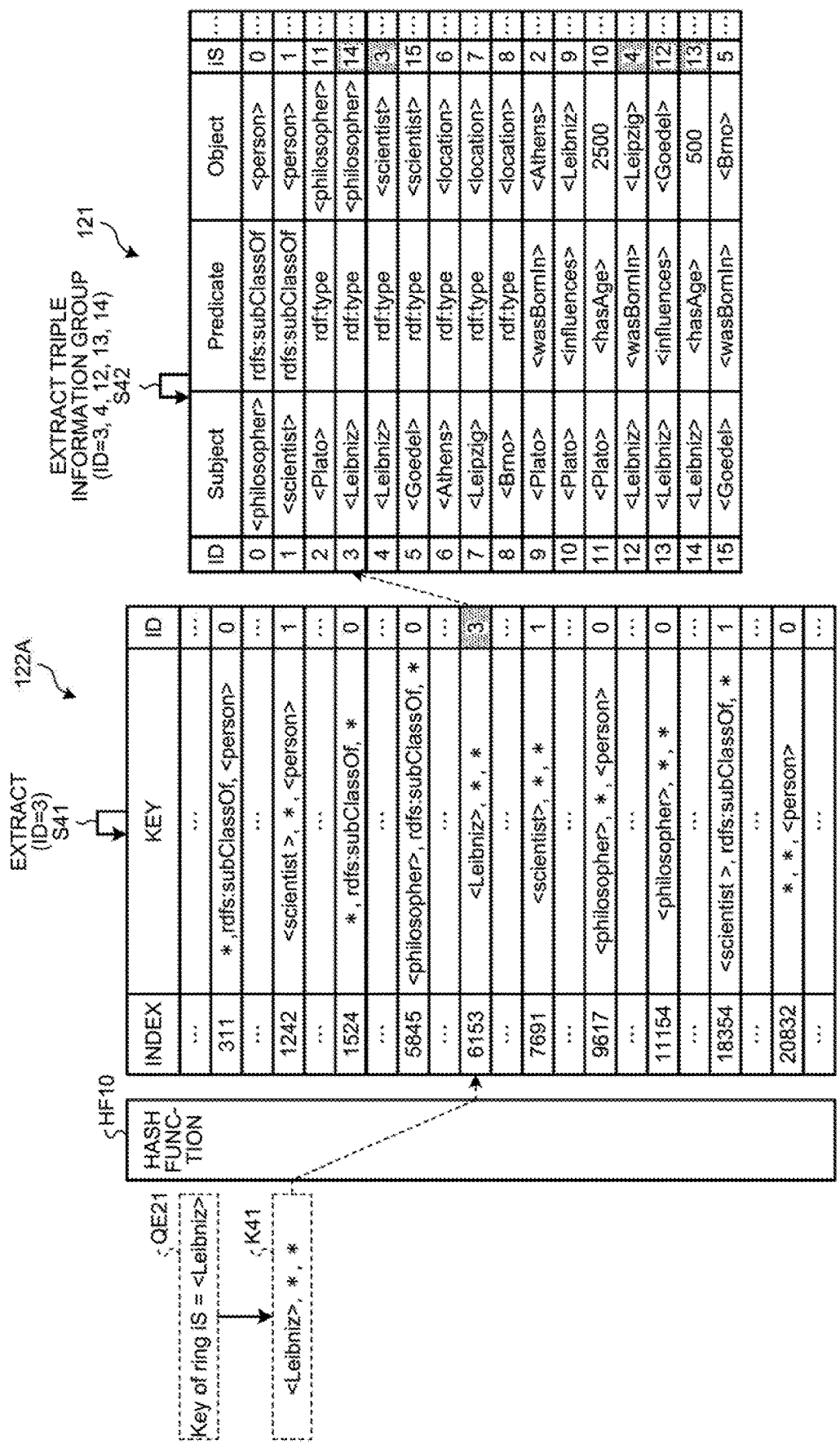

FIG.14

| ID | Subject | Predicate | Object | iS | iP | iO | iSP | iSO | iPO | NEXT ID (SEARCH SEQUENTIAL ORDER) |
|---|---|---|---|---|---|---|---|---|---|---|
| 0 | <philosopher> | rdfs:subClassOf | <person> | 0 | 1 | 1 | 0 | 0 | 1 | 1 (1) |
| 1 | <scientist> | rdfs:subClassOf | <person> | 1 | 0 | 0 | 1 | 1 | 0 | 2 (2) |
| 2 | <Plato> | rdf:type | <philosopher> | 11 | 8 | 3 | 2 | 2 | 3 | 3 (3) |
| 3 | <Leibniz> | rdf:type | <philosopher> | 14 | 2 | 2 | 5 | 3 | 2 | 4 (4) |
| 4 | <Goedel> | rdf:type | <scientist> | 15 | 5 | 5 | 4 | 4 | 5 | 6 (5) |
| 5 | <Leibniz> | rdf:type | <scientist> | 3 | 3 | 4 | 3 | 5 | 4 | END (16) |
| 6 | <Athens> | rdf:type | <location> | 6 | 4 | 8 | 6 | 6 | 8 | 7 (6) |
| 7 | <Leipzig> | rdf:type | <location> | 7 | 6 | 6 | 7 | 7 | 6 | 8 (7) |
| 8 | <Brno> | rdf:type | <location> | 8 | 7 | 7 | 8 | 8 | 7 | 9 (8) |
| 9 | <Plato> | <wasBornIn> | <Athens> | 2 | 15 | 9 | 9 | 9 | 9 | 10 (9) |
| 10 | <Plato> | <influences> | <Leibniz> | 9 | 13 | 10 | 10 | 10 | 10 | 11 (10) |
| 11 | <Plato> | <hasAge> | 2500 | 10 | 14 | 11 | 11 | 11 | 11 | 12 (11) |
| 12 | <Leibniz> | <wasBornIn> | <Leipzig> | 5 | 9 | 12 | 12 | 12 | 12 | 13 (12) |
| 13 | <Leibniz> | <influences> | <Goedel> | 12 | 10 | 13 | 13 | 13 | 13 | 14 (13) |
| 14 | <Leibniz> | <hasAge> | 500 | 13 | 11 | 14 | 14 | 14 | 14 | 15 (14) |
| 15 | <Goedel> | <wasBornIn> | <Brno> | 4 | 12 | 15 | 15 | 15 | 15 | 5 (15) |

121A

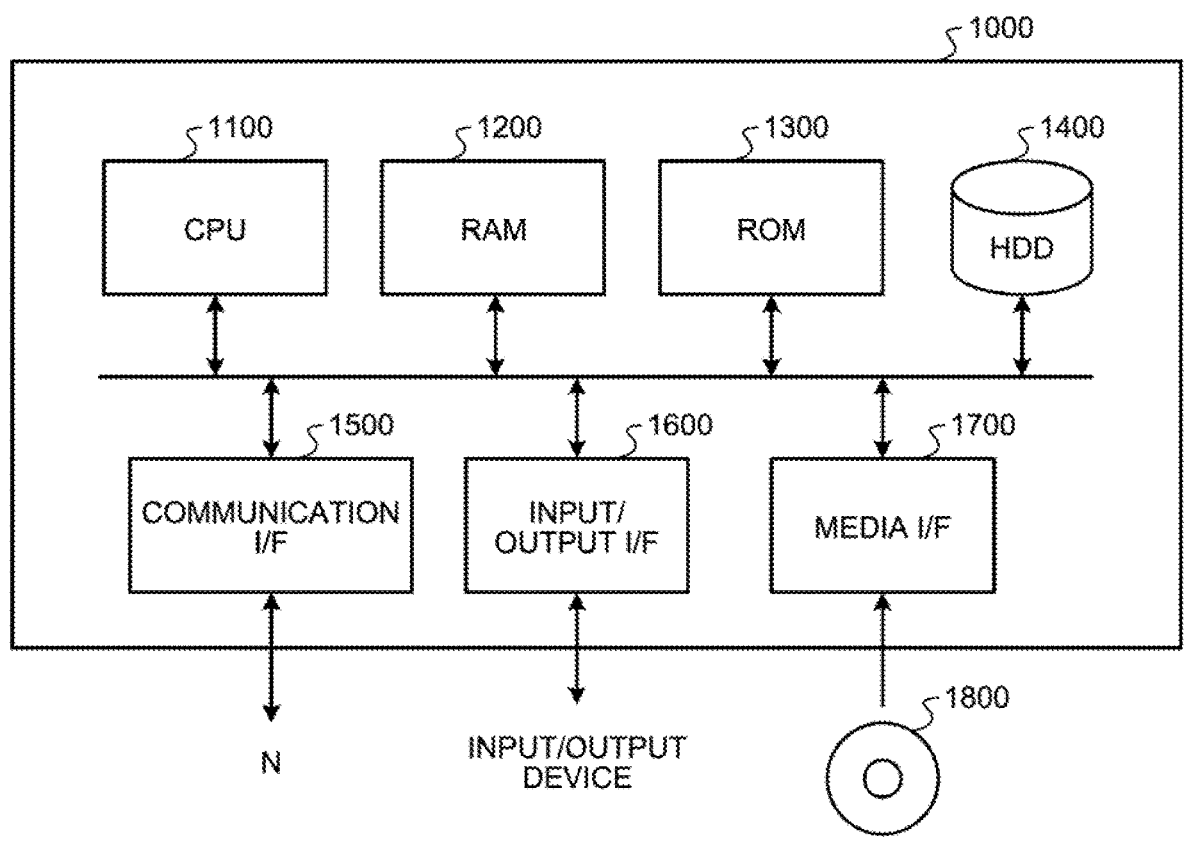

GENERATING DEVICE, GENERATING METHOD, AND NON-TRANSITORY COMPUTER-READABLE RECORDING MEDIUM

CROSS-REFERENCE TO RELATED APPLICATION(S)

The present application claims priority to and incorporates by reference the entire contents of Japanese Patent Application No. 2016-228218 filed in Japan on Nov. 24, 2016.

BACKGROUND OF THE INVENTION

1. Field of the Invention

The present invention relates to a creating device, a creating method, and a non-transitory computer-readable recording medium.

2. Description of the Related Art

Conventionally, the Resource Description Framework (RDF) is known as the framework of describing resources in a network. Furthermore, in the RDF data model, three elements of the subject, the predicate, and the object called triple represent the relationship in the resources. Furthermore, in recent years, there is a provided technology related to a query (search) about triple data (triple information) with respect to graph data that is encoded as triple and stored.

However, with the conventional technology described above, it is sometimes difficult to enable the triple information to be efficiently searched. For example, it is sometimes difficult to enable the triple information to be efficiently searched by only storing the triple information using a distributed network with respect to, for example, a request for a plurality of pieces of triple information associated with a query.

SUMMARY OF THE INVENTION

It is an object of the present invention to at least partially solve the problems in the conventional technology.

According to one aspect of an embodiment, a creating device includes an acquiring unit that acquires a plurality of pieces of triple information indicating a relationship related to three types of elements, and a creating unit that creates, from among the pieces of the triple information acquired by the acquiring unit, association information that associates a triple information group having a predetermined relationship related to the three types of elements.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating an example of a triple information storage unit according to the embodiment;

FIG. 13 is a diagram illustrating an example of extracting information performed by using an associative array according to the embodiment;

FIG. 14 is a diagram illustrating another configuration example of the triple information storage unit according to the embodiment; and FIG. 15 is a block diagram illustrating an example of the hardware configuration of a computer that implements the function of the creating device.

DETAILED DESCRIPTION OF THE PREFERRED EMBODIMENTS

Figure 1:
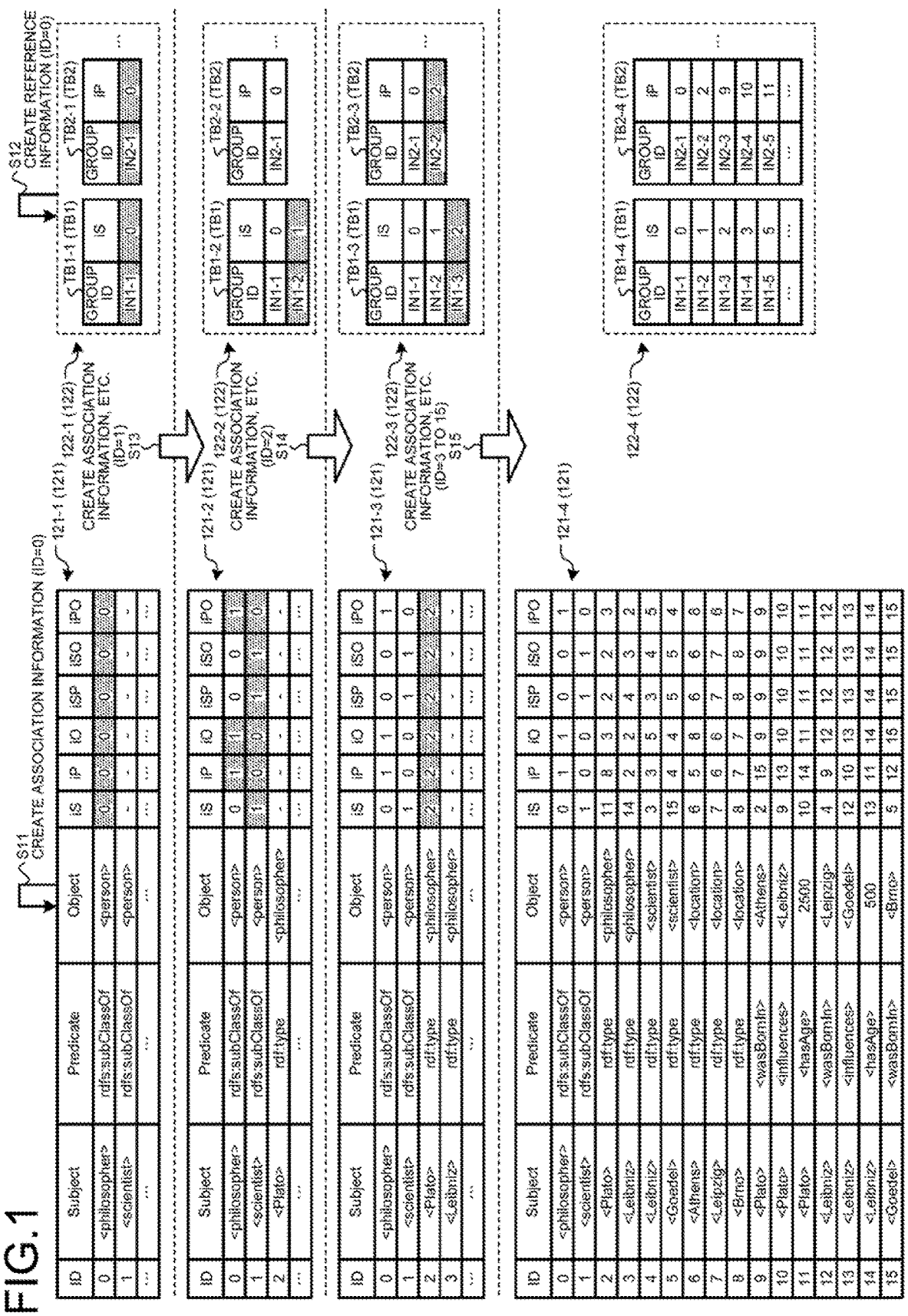
FIG. 1 is a diagram illustrating an example of a creating process according to an embodiment.

A mode (hereinafter, referred to as an "embodiment") for carrying out a creating device, a creating method, and a creating program according to the present invention will be described in detail below with reference to the accompanying drawings. The creating device, the creating method, and the creating program according to the present invention are not limited by the embodiment. And the creating device, the creating method, and the creating program in the embodiment can also be read as a generating device, a generating method, and a generating program, respectively. Furthermore, in the embodiments below, the same components are denoted by the same reference numerals and an overlapping description will be omitted.

1. Creating Process

An example of a creating process according to an embodiment will be described with reference to FIG. 1. FIG. 1 is a diagram illustrating an example of a creating process according to an embodiment. FIG. 1 illustrates a case of creating, regarding triple information stored in a triple information storage unit 121 in a creating device (a generating device) 100 (see FIG. 3), a plurality of pieces of association information associated with each of a plurality of combinations that include one or more elements from among three types of elements. In the example illustrated in FIG. 1, the creating device 100 creates, as the association information, a circular linked list related to a triple information group except for the triple information groups associated with the combinations that include all of the three types of elements; however, a description will be specifically given in detail in an explanation of a process. Furthermore, the triple information mentioned here is information based on a data model of the Resource Description Framework (RDF) and information that represents the relationship, in the resources, by using three elements (triple) of a subject, a predicate, and an object.

Furthermore, in the example illustrated in FIG. 1, the triple information storage unit 121 is described as triple information storage units 121-1 to 121-4 in accordance with an update of the association information stored in the triple information storage unit 121. Furthermore, the triple information storage units 121-1 to 121-4 are the same triple information storage unit 121. Furthermore, in a description below, the triple information storage units 121-1 to 121-4 are referred to as the triple information storage unit 121 as long as the triple information storage units 121-1 to 121-4 need not be distinguished.

Furthermore, the triple information storage unit 121-4 illustrated in FIG. 1 is the same as the triple information storage unit 121 illustrated in FIG. 4. Namely, 16 pieces of triple information are stored in the triple information storage unit 121. The example illustrated in FIG. 1 indicates a case in which the creating device 100 creates the association information by using, as the target, the 16 pieces of triple information stored in the triple information storage unit 121.

For example, the triple information storage unit 121 illustrated in FIG. 1 has items, such as "ID", "Subject", "Predicate", "Object", "iS", "iP", "iO", "iSP", "iSO", and "iPO".

The "ID" indicates identification information for identifying the triple information. The "Subject" indicates the value associated with the subject of the triple information identified by the ID. The "Predicate" indicates the value associated with the predicate of the triple information identified by the ID. The "Object" indicates the value associated with the object of the triple information identified by the ID.

For example, in the example illustrated in FIG. 1, triple information T0 indicates that the subject is "<philosopher>", i.e., a "philosopher". Furthermore, in the example illustrated in FIG. 1, the triple information T0 indicates that the predicate is "rdfs:subClassOf" and is a predetermined property. For example, the predicate "rdfs:subClassOf" indicates that the value associated with the subject is a member of the class associated with the object, i.e., a subclass (lower level concept). Furthermore, in the example illustrated in FIG. 1, the triple information T0 indicates that the object is "<person>", i.e., a "human". For example, the character string between "<" and ">" indicates a predetermined target.

In the example illustrated in FIG. 1, the triple information T0 indicates that the subject "<philosopher>", i.e., the object, is the subclass of "<person>". Namely, the triple information T0 indicates that the philosopher is the subclass of the human.

Furthermore, the information associated with the "Subject", the "Predicate", and the "Object" in the triple information storage unit 121 may sometimes be referred to as triple information. For example, the triple information (the triple information T0) identified by the ID "0" is "<philosopher>,rdfs:subClassOf,<person>". In RDF, a delimiter character " " (space) is normally used. But, in the embodiment, we use a delimiter character "," in place of the delimiter character " " (space) for visibility. So the delimiter character "," in the embodiment can also be replaced by the delimiter character " " (space). Furthermore, the meaning of the delimiter character "," in the embodiment may be different from a meaning of the delimiter character "," in conventional RDF.

Furthermore, as described above, in a case where "triple information T* (* is an arbitrary numerical value)" is described, the subject triple information is the triple information identified by the ID of "*". For example, if "triple information T1" is described, the subject triple information is the triple information identified by the ID "1". For example, the triple information T1 is "<scientist>,rdfs:subClassOf,<person>". For example, if "triple information T15" is described, the subject triple information is the triple information identified by the ID "15". For example, the triple information T15 is "<Goedel>,<wasBornIn>,<Brno>".

Furthermore, "iS", "iP", "iO", "iSP", "iSO", and "iPO" in the triple information storage unit 121 are associated with the combinations of each of the three elements and the association information associated with each of the combinations is stored.

Furthermore, "iS" stores therein the association information that is a circular linked list that connects the triple information having a common value associated with the subject. Furthermore, "iP" stores therein the association information that is a circular linked list that connects the triple information a common value associated with the predicate. Furthermore, "iO" stores therein the association information that is a circular linked list that connects the triple information having a common value associated with the object.

Furthermore, "iSP" stores therein the association information that is a circular linked list that connects the triple information having a common value associated with the subject and having a common value associated with the predicate. Furthermore, "iSO" stores therein the association information that is a circular linked list that connects the triple information having a common value associated with the subject and having a common value associated with the object. Furthermore, "iPO" stores therein the association information that is a circular linked list that connects the triple information having a common value associated with the predicate and having a common value associated with the object.

In the example illustrated in FIG. 1, regarding the 16 pieces of the triple information T0 to T15 stored in the triple information storage unit 121, the creating device 100 creates association information for each combination. In other words, regarding the 16 pieces of the triple information T0 to T15 stored in the triple information storage unit 121, the creating device 100 creates the association information for each of the six items of "iS", "iP", "iO", "iSP", "iSO", and "iPO" associated with each of the combinations.

Furthermore, in the example illustrated in FIG. 1, regarding the triple information storage unit 121-1 to 121-3 other than the triple information storage unit 121-4, only the triple information portion related to a process is illustrated; however, similarly to the triple information storage unit 121-4, it is assumed that the 16 pieces of the triple information are stored. Namely, the triple information storage units 121-1 to 121-4 store therein the same triple information, except that the association information is updated.

First, as illustrated in FIG. 1, the creating device 100 creates the association information of the triple information T0 identified by the ID "0" (Step S11). To simplify the explanation, the example illustrated in FIG. 1 indicates a case in which the creating device 100 creates the pieces of the association information in the order from the ID "0" to the ID "15", i.e., in ascending order of the values of the IDs; however, the creating device 100 may also create the association information by using various procedures.

As indicated by the triple information storage unit 121-1 illustrated in FIG. 1, the creating device 100 stores "0" in "iS", "iP", "iO", "iSP", "iSO", and "iPO" associated with the triple information T0. At the time of Step S11, because only the triple information T0 is targeted for the creating process of the association information, the ID "0" that is the identification information of the own triple information T0 is stored in "iS", "iP", "iO", "iSP", "iSO", and "iPO".

In this way, the ID "0" that refers to the own triple information T0 is stored in "iS", "iP", "iO", "iSP", "iSO", and "iPO" of the triple information T0. Namely, at the time of Step S11, this indicates that the triple information group having a combination common to the triple information T0 is only the triple information T0. For example, because the ID "0" that refers to the own triple information T0 is stored in "iPO" of the triple information T0, at the time of Step S11, the triple information having the predicate and the object common to the triple information T0 is only the triple information T0.

Furthermore, in the example illustrated in FIG. 1, at Step S11, because the triple information T1 has not yet been processed, "iS", "iP", "iO", "iSP", "iSO", and "iPO" associated with the triple information T1 becomes "–(unset)", as indicated by the triple information storage unit 121-1 illustrated in FIG. 1. Furthermore, although not illustrated in the triple information storage unit 121-1 in FIG. 1, in the triple information storage unit 121-1, regarding "iS", "iP", "iO", "iSP", "iSO", and "iPO" associated with the remaining 14 pieces of the triple information T2 to T15, the status thereof also becomes "–(unset)".

Furthermore, as illustrated in FIG. 1, the creating device 100 creates reference information associated with the association information created at Step S11 (Step S12). For example, regarding the association information that is added to the triple information storage unit 121 and that becomes a new circular linked list, the creating device 100 adds the ID that is the identification information of the triple information to a reference information storage unit 122. Specifically, the creating device 100 stores, in the reference information storage unit 122, from among the six combinations of "iS", "iP", "iO", "iSP", "iSO", and "iPO", the ID that is the identification information of the triple information by associating the ID with the combination to which the association information that becomes the new circular linked list is added.

In the following, the reference information storage unit 122 illustrated in FIG. 1 will be described. Furthermore, in the example illustrated in FIG. 1, in accordance with an update of the reference information stored in the reference information storage unit 122, the reference information storage unit 122 is described as reference information storage units 122-1 to 122-4. Furthermore, the reference information storage units 122-1 to 122-4 are the same reference information storage unit 122. Furthermore, in a description below, the reference information storage units 122-1 to 122-4 are referred to as the reference information storage unit 122 as long as the reference information storage units 122-1 to 122-4 need not be distinguished.

For example, the reference information storage unit 122 stores, in each table, the reference information associated with each of the combinations of the subject, the predicate, and the object (hereinafter, sometimes referred to as "SPO"). Furthermore, in a description below, because the reference information is used as the information for specifying a circular linked list that corresponds to each of the pieces of association information, the reference information is also referred to as specific information. The reference information storage unit 122 illustrated in FIG. 1 corresponds to the reference information storage unit 122 illustrated in FIG. 5 and stores therein the specific information associated with each of the six combinations of "iS", "iP", "iO", "iSP", "iSO", and "iPO".

For example, the first table TB1 has items, such as "group ID" and "iS". Namely, the first table TB1 stores therein the specific information associated with the triple information group having a common subject. Furthermore, for example, the second table TB2 has items, such as "group ID" and "iP". Namely, the second table TB2 stores therein the specific information associated with the triple information group having a common predicate. Furthermore, for example, the third table TB3 has items, such as "group ID" and "iO". Namely, the third table TB3 stores therein the specific information associated with the triple information group having a common object.

For example, the fourth table TB4 has items, such as "group ID" and "iSP". Namely, the fourth table TB4 stores therein the specific information associated with the triple information group having a common subject and predicate. Furthermore, for example, the fifth table TB5 has items, such as "group ID" and "iSO". Namely, the fifth table TB5 stores therein the specific information associated with the triple information group having a common subject and object. Furthermore, for example, the sixth table TB6 has items, such as "group ID" and "iPO". Namely, the sixth table TB6 stores therein the specific information associated with the triple information group having a common predicate and object.

For example, the "group ID" in the first table TB1 indicates the identification information for identifying the specific information associated with the triple information group having a common subject. Furthermore, the "group ID" may also be a predetermined index, such as the address of an array. Furthermore, for example, "iS" in the first table TB1 indicates the specific information associated with the corresponding group ID. In the example illustrated in FIG. 1, in "iS" in the first table TB1, the "ID" that is the identification information of one of the pieces of triple information in the triple information group having a common subject.

To simplify the explanation, the example illustrated in FIG. 1 illustrates only the first table TB1 and the second table TB2 from among the first table TB1 to the sixth table TB6 (see FIG. 5) included in the reference information storage unit 122. Furthermore, the creating device 100 may also store values associated with the corresponding IDs in the first table TB1 to the sixth table TB6 in the reference information storage unit 122. For example, the creating device 100 may also store, in association with the ID "0", "<philosopher>" that is the subject of the triple information T0 in the first table TB1, the fourth table TB4, or the fifth table TB5. For example, the creating device 100 may also store, in association with the ID "0", "rdfs:subClassOf" that is the predicate of the triple information T0 in the second table TB2, the fourth table TB4, or the sixth table TB6.

Furthermore, in the example illustrated in FIG. 1, the first table TB1 is described as first tables TB1-1 to TB1-4 in accordance with an update of the first table TB1. Furthermore, the first tables TB1-1 to TB1-4 are the same first table TB1. Furthermore, in a description below, the first tables TB1-1 to TB1-4 are referred to as the first table TB1 as long as the first tables TB1-1 to TB1-4 need not be distinguished. Furthermore, in the example illustrated in FIG. 1, the second table TB2 is described as the second tables TB2-1 to TB2-4 in accordance with an update of the second table TB2.

Furthermore, the second tables TB2-1 to TB2-4 are the same second table TB2. Furthermore, in a description below, the second tables TB2-1 to TB2-4 are referred to as the second table TB2 as long as the second tables TB2-1 to TB2-4 need not be distinguished.

In the example illustrated in FIG. 1, at the time of Step S11, because only the triple information T0 is targeted for the creating process of the association information, the creating device 100 adds the ID "0" that is the identification information of the triple information T0 to each of the first table TB1 to the sixth table TB6 (see FIG. 5) included in the reference information storage unit 122. Namely, this indicates that, in the reference information storage unit 122-1, the association information that is a circular linked list that connects the triple information group including the triple information T0 is added, at the time of Step S11, to the six combinations of "iS", "iP", "iO", "iSP", "iSO", and "iPO" in the triple information storage unit 121-1.

In the example illustrated in FIG. 1, as indicated by the first table TB1-1, the ID "0" is added to "iS" associated with the group ID "IN1-1". Furthermore, in the example illustrated in FIG. 1, as indicated by the second table TB2-1, the ID "0" is added to "iP" associated with the group ID "IN2-1". Furthermore, although not illustrated in FIG. 1, the ID "0" is also added to the remaining four tables of the third table TB3 to the sixth table TB6. For example, the ID "0" is added to "iO" in the third table TB3, the ID "0" is added to "iSP" in the fourth table TB4, the ID "0" is added to "iSO" in the fifth table TB5, and ID "0" is added to "iPO" in the sixth table TB6.

Then, the creating device 100 creates the association information or the reference information (hereinafter, sometimes referred to as "association information, or the like") of the triple information T1 identified by the ID "1" (Step S13).

First, a description will be given of creating the association information of the triple information T1. As indicated by the triple information storage unit 121-2 illustrated in FIG. 1, the creating device 100 stores "1" in "iS" that is associated with the triple information T1. In this way, because the subject "<scientist>" of the triple information T1 is different from the subject "<philosopher>" of the triple information T0, regarding the combination "iS", the creating device 100 sets the triple information T1 and the triple information T0 to the pieces of information each belonging to a different circular linked list. For example, if the triple information having a subject common to the subject of the triple information T1 is not present in the triple information in which association information is created before the process performed on the triple information T1, the creating device 100 creates a circular linked list including the triple information T1.

Furthermore, because the subject "<scientist>" of the triple information T1 is different from the subject "<philosopher>" of the triple information T0, regarding combination of "iSP" and "iSO", the creating device 100 also sets the triple information T1 and the triple information T0 to the pieces of information each belonging to a circular linked list. Namely, as indicated by the triple information storage unit 121-2 illustrated in FIG. 1, the creating device 100 stores "1" in "iSP" and "iSO" associated with the triple information T1.

In contrast, because the predicate "rdfs:subClassOf" of the triple information T1 and the predicate "rdfs:subClassOf" of the triple information T0 are the same, regarding the combination "iP", the creating device 100 sets the triple information T1 and the triple information T0 to the information belonging to the same circular linked list. In this way, if the triple information having the predicate common to the triple information T1 is present in the triple information in which the association information is created before the process performed on the triple information T1, the creating device 100 creates the association information such that the triple information T1 is added to the circular linked list of the triple information group that includes the subject triple information.

For example, the creating device 100 stores the ID stored in "iP" associated with the triple information T0 in "iP" associated with the triple information T1 and then updates "iP" associated with the triple information T0 to the ID "1" that is the identification information of the triple information T1. Specifically, as indicated by the triple information storage unit 121-2 illustrated in FIG. 1, the creating device 100 updates the information of "iP" in the row associated with the ID "0" to the ID "1" and adds the ID "0" to "iP" in the row associated with the ID "1". Consequently, regarding the combination "iP", the creating device 100 creates the circular linked list that connects the triple information T0 and the triple information T1.

Furthermore, because the object "<person>" of the triple information T1 and the object "<person>" of the triple information T0 are the same, regarding the combination "iO", the creating device 100 sets the triple information T1 and the triple information T0 to the information belonging to the same circular linked list. Specifically, as indicated by the triple information storage unit 121-2 illustrated in FIG. 1, the creating device 100 updates the information of "iO" in the row associated with the ID "0" to the ID "1" and adds the ID "0" to "iO" in the row associated with the ID "1". Consequently, regarding the combination "iO", the creating device 100 creates the circular linked list that connects the triple information T0 and the triple information T1.

Furthermore, because the predicate and the object are the same in the triple information T1 and the triple information T0, the creating device 100 sets, regarding the combination "iPO", the triple information T1 and the triple information T0 to the information belonging to the same circular linked list. Specifically, as indicated by the triple information storage unit 121-2 illustrated in FIG. 1, the creating device 100 updates the information of "iPO" in the row associated with the ID "0" to the ID "1" and adds the ID "0" to "iO" in the row associated with the ID "1". Consequently, the creating device 100 creates, regarding the combination "iPO", the circular linked list that connects the triple information T0 and the triple information T1.

Furthermore, as illustrated in FIG. 1, the creating device 100 creates the reference information associated with the association information created at Step S13. For example, the creating device 100 adds the ID "1" that is the identification information of the triple information T1 to the table associated with the combination in which a new circular linked list including the triple information T1 out of the first table TB1 to the sixth table TB6 is created.

Specifically, the creating device 100 adds the ID "1" that is the identification information of the triple information T1 to the table that is associated with the three combinations of "iS", "iSP", and "iSO" and in which the new circular linked list including the triple information T1 is created.

In the example illustrated in FIG. 1, as indicated by the first table TB1-2, the ID "1" is added to "iS" that is associated with the group ID "IN1-2". Furthermore, although not illustrated in FIG. 1, the ID "1" is also added to the two tables of the fourth table TB4 that is associated with "iSP" and the fifth table TB5 that is associated with "iSO".

In contrast, in the example illustrated in FIG. 1, regarding the combination "iP", because the triple information T1 and the triple information T0 are the information belonging to the same circular linked list, as indicated by the second table TB2-2, the ID "1" is not added to the second table TB2. Furthermore, although not illustrated in FIG. 1, the ID "1" is not added to the remaining two tables of the third table TB3 and the sixth table TB6.

As described above, the creating device 100 stores, in the second table TB2, the reference information (specific information) that specifies the triple information T0 in which the predicate is "rdfs:subClassOf". Consequently, if the creating device 100 searches for the triple information in which the predicate is "rdfs:subClassOf", the creating device 100 can specify the triple information T0 in which the predicate is "rdfs:subClassOf" by referring to the second table TB2. Furthermore, because the creating device 100 stores, in "iP" in the triple information storage unit 121, the information related to the circular linked list that connects the triple information group in which the predicate is "rdfs:subClassOf", the creating device 100 can specify all of the pieces of triple information in which the predicate is "rdfs:subClassOf" by tracing the circular linked list from the specified triple information T0.

In the example illustrated in FIG. 1, because the creating device 100 stores, in "iP" in the triple information storage unit 121, the information related to the circular linked list that connects the triple information T0 and the triple information T1 in each of which the predicate is "rdfs:subClassOf", the creating device 100 can specify the triple information T0 and the triple information T1 in each of which the predicate is "rdfs:subClassOf" by tracing the circular linked list from the specified triple information T0. Furthermore, here, to simplify the explanation, a case in which two pieces of triple information are included in the circular linked list is described; however, in the circular linked list, one or more arbitrary pieces of triple information (for example, 2,000 pieces, 10,000 pieces, etc.) are included.

Then, the creating device 100 creates the association information of, for example, the triple information T2 identified by the ID "2" (Step S14). In the example illustrated in FIG. 1, the subject of each of the triple information T0 and the triple information T1 processed before Step S14 is different from the subject "<Plato>" of the triple information T2. Furthermore, in the example illustrated in FIG. 1, the predicate of the triple information T0 and the triple information T1 processed before Step S14 is different from the predicate "rdf:type" of the triple information T2. In the example illustrated in FIG. 1, the object of each of the triple information T0 and the triple information T1 processed before Step S14 is different from the object "<philosopher>" of the triple information T2.

Consequently, as indicated by the triple information storage unit 121-3 illustrated in FIG. 1, the creating device 100 stores the ID "2" that is the identification information of the own triple information T2 in "iS", "iP", "iO", "iSP", "iSO", and "iPO" that are associated with the triple information T0. Furthermore, the object "<philosopher>" of the triple information T2 is the same as the subject "<philosopher>" of the triple information T0 and the triple information T1; however, because the elements are different in terms of the object and the subject, the creating device 100 processes them as different elements.

Furthermore, as described above, because the subject, the predicate, and the object of the triple information T2 are different from those of the triple information T0 and the triple information T1, in the example illustrated in FIG. 1, the creating device 100 adds the ID "2" that is the identification information of the triple information T2 to each of the first table TB1 to the sixth table TB6 (see FIG. 5) included in the reference information storage unit 122. Namely, the reference information storage unit 122-3 indicates that the association information that is the circular linked list that connects the triple information group including the triple information T2 is added to the six combinations of "iS", "iP", "iO", "iSP", "iSO", and "iPO" in the triple information storage unit 121-3 at Step S14.

In the example illustrated in FIG. 1, as indicated by the first table TB1-3, the ID "2" is added to "iS" associated with the group ID "IN1-3". Furthermore, in the example illustrated in FIG. 1, as indicated by a second table TB2-3, the ID "2" is added to "iP" associated with the group ID "IN2-2". Furthermore, although not illustrated in FIG. 1, the ID "2" is also added to the remaining four tables of the third table TB3 to the sixth table TB6. For example, the ID "2" is added to "iO" in the third table TB3, the ID "2" is added to "iSP" in the fourth table TB4, the ID "2" is added to "iSO" in the fifth table TB5, and the ID "2" is added to "iPO" in the sixth table TB6.

Furthermore, the creating device 100 repeatedly performs the process described above on the 13 pieces of the triple information, i.e., from the triple information T3 identified by the ID "3" to the triple information T15 identified by the ID "15", thereby sequentially creating the association information of the pieces of the triple information T3 to T15, or the like (Step S15). Consequently, the creating device 100 creates the association information indicated by the triple information storage unit 121-4 illustrated in FIG. 1 and the reference information indicated by the reference information storage unit 122-4 illustrated in FIG. 1.

As described above, the creating device 100 creates, as the association information, the circular linked list related to the triple information group except for the triple information groups associated with the combinations that include all of the three types of elements, thereby enabling the triple information to be efficiently searched. A search performed by using the association information will be described in detail later. Furthermore, if new triple information is added, by creating association information or the like of the new triple information by using the same process as described above, the creating device 100 can appropriately create association information or the like even if the new triple information is added.

2. Configuration of the Creating System

Figure 2:
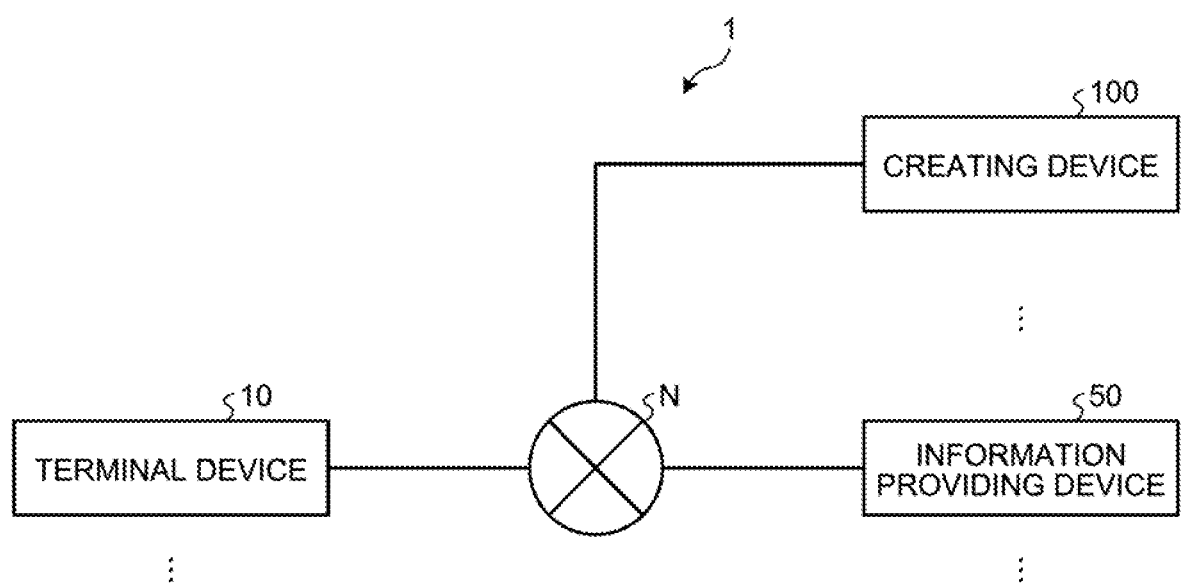
FIG. 2 is a diagram illustrating a configuration example of a creating system according to the embodiment.

As illustrated in FIG. 2, the creating system 1 includes a terminal device 10, an information providing device 50, and a creating device 100. The terminal device 10, the information providing device 50, and creating device 100 are connected via a predetermined network N such that the devices can be communicated with each other in a wired or wireless manner. FIG. 2 is a diagram illustrating a configuration example of a creating system according to the embodiment. Furthermore, in the creating system 1 illustrated in FIG. 2, a plurality of the terminal devices 10, a plurality of the information providing devices 50, and a plurality of the creating devices 100 may also be included.

Figure 6:
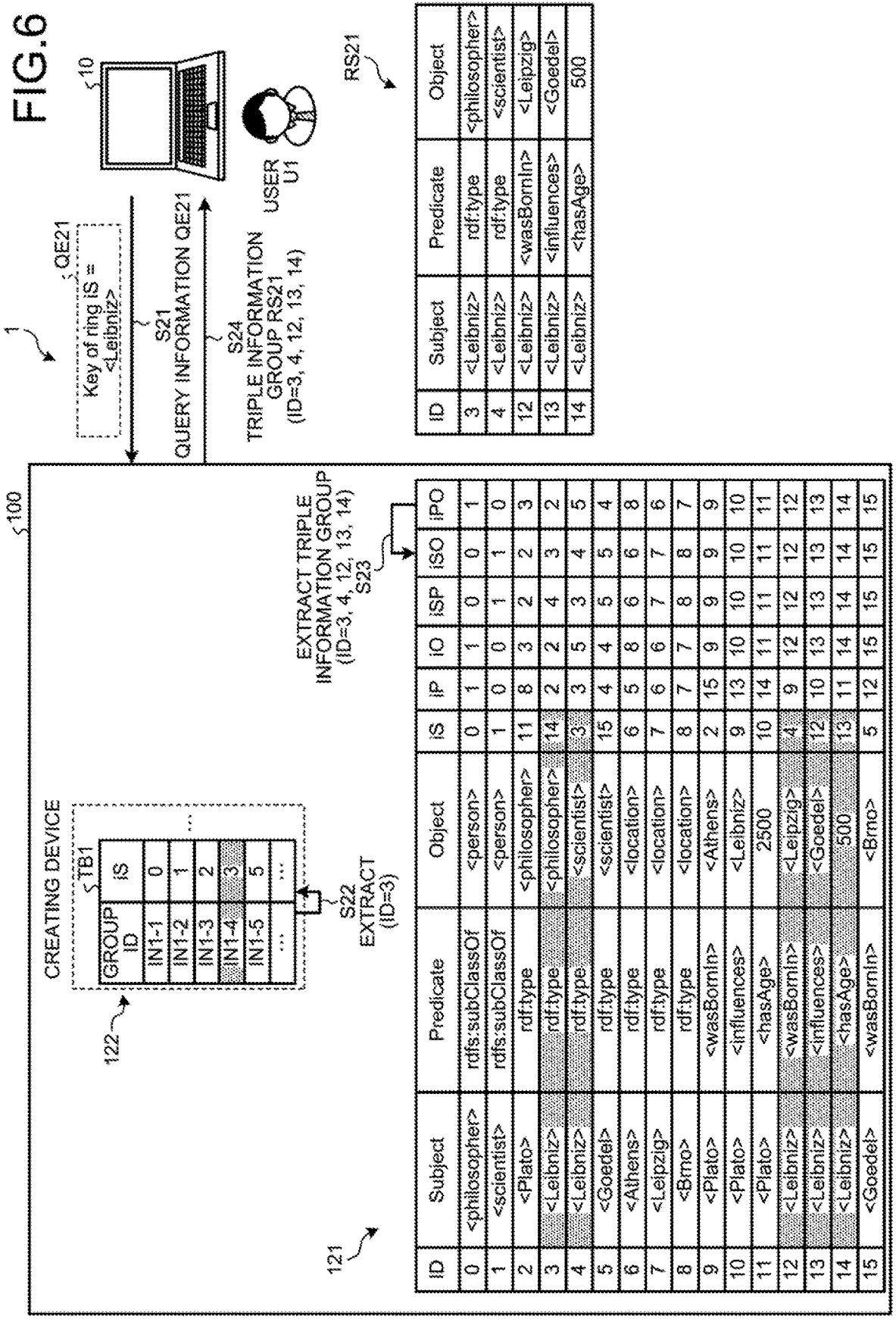
FIG. 6 is a diagram illustrating an example of a process of providing information associated with a query according to the embodiment.
Figure 8:
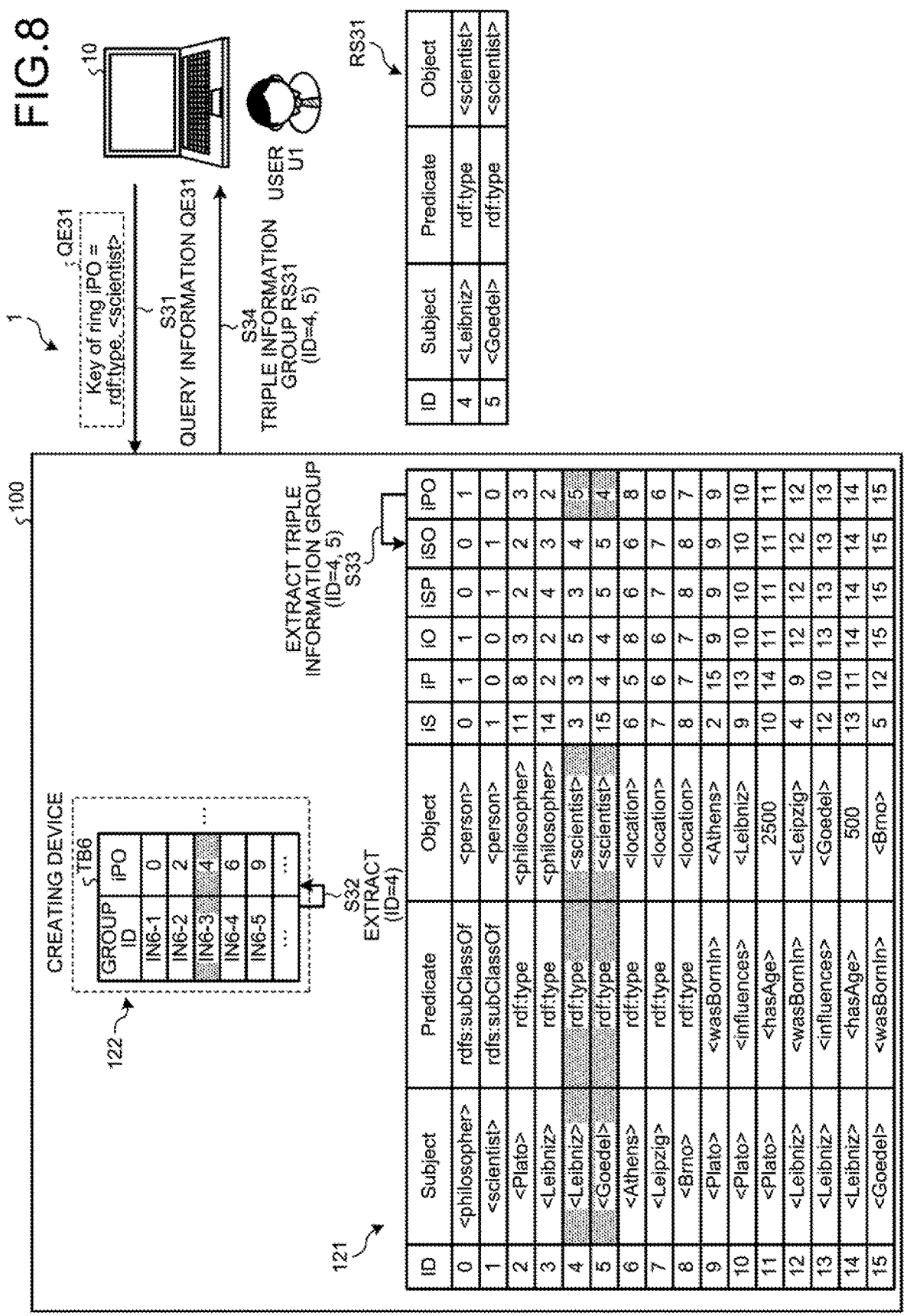
FIG. 8 is a diagram illustrating an example of a process of providing information associated with a query according to the embodiment.

The terminal device 10 is an information processing apparatus used by a user. The terminal device 10 receives various kinds of operations performed by the user. In a description below, the terminal device 10 is sometimes referred to as a user. Namely, in a description below, a user can also be read as the terminal device 10. Furthermore, the terminal device 10 described above can be implemented by, for example, a smartphone, a tablet terminal, a notebook personal computer (PC), a desktop PC, a mobile phone, a personal digital assistance (PDA), or the like. The examples illustrated in FIGS. 6 and 8 illustrate a case in which the terminal device 10 is a notebook PC.

The information providing device 50 is an information processing apparatus that stores therein the triple information based on the character information or the like collected from various kinds of external devices, such as web servers, or the like. For example, the information providing device 50 creates the triple information based on the information related to the resources collected from various kinds of external devices, such as web servers, or the like. Furthermore, for example, the information providing device 50 provides the triple information to the creating device 100.

The creating device 100 is an information processing apparatus that creates association information that associates triple information group having a predetermined relationship related to the three types of elements from among the plurality of pieces of the triple information. For example, the creating device 100 creates, for each triple information group, information related to the circular linked list that connects the triple information included in each of the triple information groups. Furthermore, if the creating device 100 acquires a query in the embodiment, the creating device 100 provides the triple information associated with the query based on the created association information (circular linked list). Furthermore, the creating device 100 may also create triple information based on the information related to the resources collected from various kinds of external devices, such as web servers, or the like.

3. Configuration of the Creating Device

Figure 3:
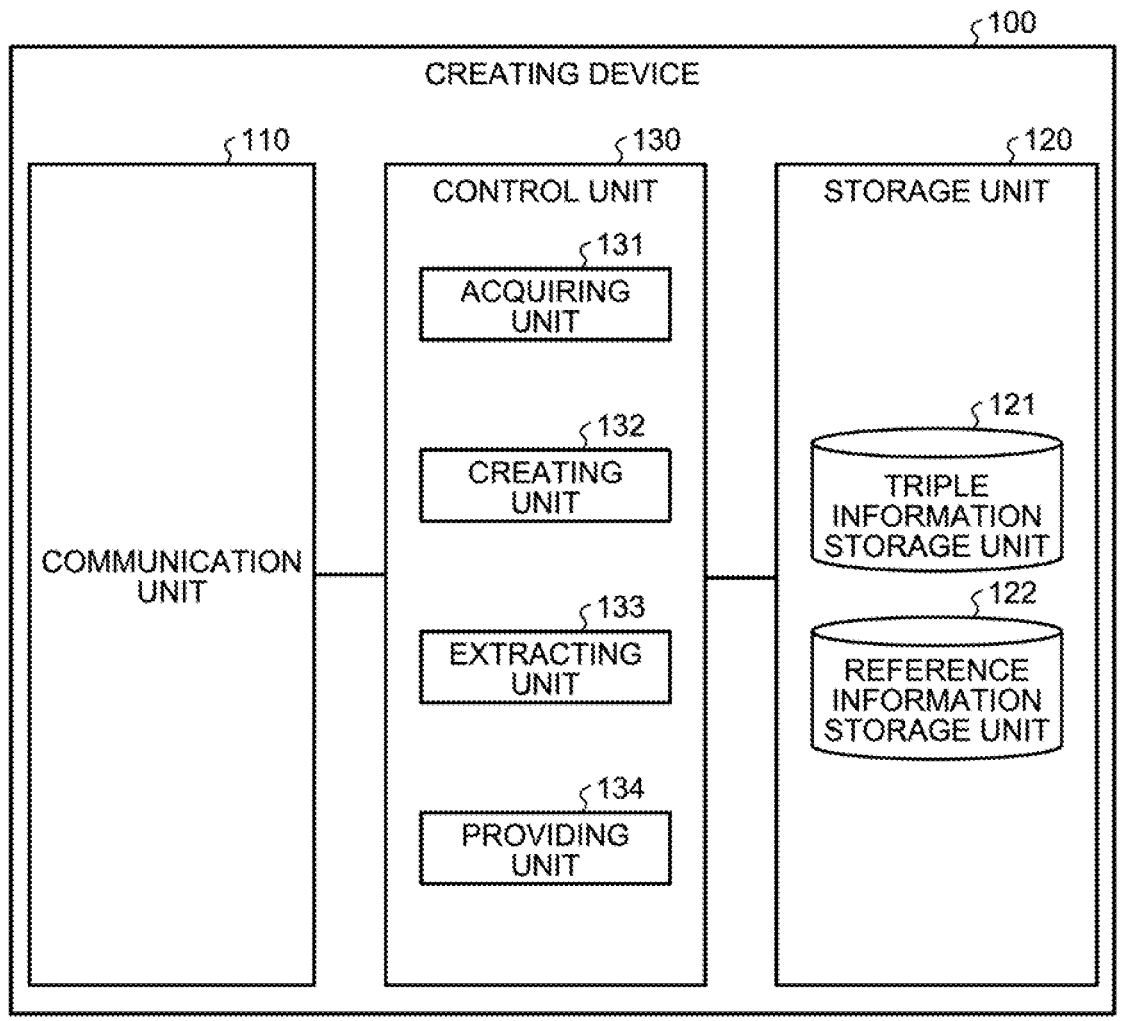
FIG. 3 is a diagram illustrating a configuration example of a creating device according to the embodiment.

In the following, the configuration of the creating device 100 according to the embodiment will be described with reference to FIG. 3. FIG. 3 is a diagram illustrating a configuration example of the creating device 100 according to the embodiment. As illustrated in FIG. 3, the creating device 100 includes a communication unit 110, a storage unit 120, and a control unit 130. Furthermore, the creating device 100 may also include an input unit (for example, a keyboard, a mouse, or the like) that receives various kinds of operations from, for example, an administrator of the creating device 100, or may also include a displaying unit (for example, a liquid crystal display, or the like) used to display various kinds of information.

Communication Unit 110

The communication unit 110 is implemented by, for example, a network interface card (NIC), or the like. Furthermore, the communication unit 110 is connected to a network (for example, the network N illustrated in FIG. 2) in a wired or wireless manner and sends and receives information to and from the terminal device 10.

Storage Unit 120

The storage unit 120 is implemented by, for example, a semiconductor memory device, such as a random access memory (RAM), a flash memory, or the like, or a storage device, such as a hard disk, an optical disk, or the like. The storage unit 120 according to the embodiment includes, as illustrated in FIG. 3, the triple information storage unit 121 and the reference information storage unit 122.

Triple Information Storage Unit 121

The triple information storage unit 121 according to the embodiment stores therein various kinds of information related to the triple. For example, the triple information storage unit 121 stores therein triple information or association information. FIG. 4 is a diagram illustrating an example of the triple information storage unit according to the embodiment. The triple information storage unit 121 illustrated in FIG. 4 stores therein items, such as "ID", "Subject", "Predicate", "Object", "iS", "iP", "iO", "iSP", "iSO", and "iPO".

The "ID" indicates the identification information for identifying the triple information. Furthermore, the "Subject" indicates the value associated with the subject of the triple information identified by the ID. Furthermore, the "Predicate" indicates the value associated with the predicate of the triple information identified by the ID. Furthermore, the "Object" indicates the value associated with the object of the triple information indicated by the ID.

Furthermore, in "iS", the information related to the circular linked list that connects the triple information having a common value associated with the subject is stored. Furthermore, in "iP", the information related to the circular linked list that connects the triple information having a common value associated with the predicate is stored. Furthermore, in "iO", the information related to the circular linked list that connects the triple information having a common value associated with the object is stored.

Furthermore, in "iSP", the information related to the circular linked list that connects the triple information having a common value associated with the subject and a common value associated with the predicate is stored. Furthermore, in "iSO", the information related to the circular linked list that connects the triple information having a common value associated with the subject and a common value associated with the object is stored. Furthermore, in "iPO", the information related to the circular linked list that connects the triple information having a common value associated with the predicate and a common value associated with the object is stored.

For example, in the example illustrated in FIG. 4, the triple information storage unit 121 stores therein 16 pieces of the triple information T0 to T15, i.e., the triple information T0 identified by the ID "0" to the triple information T15 identified by the ID "15".

For example, in the example illustrated in FIG. 4, the triple information T0 identified by the ID "0" indicates that the subject is "<philosopher>", i.e., a "philosopher". Furthermore, for example, in the example illustrated in FIG. 4, the triple information T0 indicates that the predicate is "rdfs:subClassOf", i.e., a predetermined property. Furthermore, for example, the predicate "rdfs:subClassOf" indicates that the value associated with the subject is a member of a class associated with the object, i.e., a subclass. Furthermore, for example, in the example illustrated in FIG. 4, the triple information T0 indicates that the object is "<person>", i.e., a "human". Furthermore, for example, in the example illustrated in FIG. 4, the object "2500" of the triple information T11 or the object "500" of the triple information T14 indicates the numerical value.

In the example illustrated in FIG. 4, the triple information T0 indicates that the subject "<philosopher>", i.e., the object, is a subclass of a "<person>". Namely, the triple information T0 indicates that a philosopher is a subclass of a human.

Furthermore, the example illustrated in FIG. 4 indicates that "0" is stored in "iS" of the triple information T0 and indicates that, in the circular linked list of the triple information group having the subject common to the triple information T0, the ID that identifies the next triple information indicated by the triple information T0 is "0". In this way, because the ID "0" that refers to the own triple information T0 is stored in "iS" of the triple information T0, this indicates that the triple information group having the subject common to the triple information T0 is only one, i.e., the triple information T0.

Namely, the example illustrated in FIG. 4 indicates that, from among the pieces of the triple information T0 to T15 stored in the triple information storage unit 121, the triple information having the subject of "<philosopher>" is only one, i.e., the triple information T0, and indicates that no other triple information having the same subject as the subject "<philosopher>" of the triple information T0 is included.

Furthermore, the example illustrated in FIG. 4 indicates that "1" is stored in "iP" of the triple information T0 and indicates that, in the circular linked list of the triple information group having the predicate common to the triple information T0, the ID that identifies the next triple information indicated by the triple information T0 is "1". In this way, because the ID "1" that refers to the triple information T1 is stored in "iP" of the triple information T0, this indicates that the triple information T1 is included in the triple information group having the predicate common to the triple information T0.

Furthermore, the example illustrated in FIG. 4 indicates that "0" is stored in "iP" of the triple information T1 and indicates that, in the circular linked list of the triple information group having the predicate common to the triple information T1, the ID that identifies the next triple information indicated by the triple information T1 is "0". In this way, because the ID "0" that refers to the triple information T0 is stored in "iP" of the triple information T1, this indicates that the triple information T0 is included in the triple information group having the predicate common to the triple information T1. Because the next triple information indicated by the triple information T1 is the triple information T0 described above, this indicates that, in the circular linked list of the triple information group having the predicate common to the triple information T0, the two pieces of the triple information T0 and the triple information T1 are included.

Namely, the example illustrated in FIG. 4 indicates that, from among the pieces of the triple information T0 to T15 stored in the triple information storage unit 121, the triple information having the predicate of "rdfs:subClassOf" is two pieces, i.e., the triple information T0 and the triple information T1.

Furthermore, the example illustrated in FIG. 4 indicates that "0" is stored in "iSO" of the triple information T0 and indicates that, in the circular linked list of the triple information group having the subject and the object that are common to the triple information T0, the ID that identifies the next triple information indicated by the triple information T0 is "0". In this way, because the ID "0" that refers to the own triple information T0 is stored in "iSO" of the triple information T0, this indicates that the triple information group having the subject and the object common to the triple information T0 is only one piece, i.e., the triple information T0.

Namely, the example illustrated in FIG. 4 indicates that, from among the pieces of the triple information T0 to T15 stored in the triple information storage unit 121, the triple information having the subject of "<philosopher>" and the object of "<person>" is only one piece, i.e., the triple information T0, and indicates that no other triple information having the same subject as the subject "<philosopher>" of the triple information T0 and having the same object as the object "<person>" of the triple information T0 is included.

Furthermore, the triple information storage unit 121 is not limited to the unit described above and may also store therein various kinds of information in accordance with purposes.

Reference Information Storage Unit 122

Figure 5:
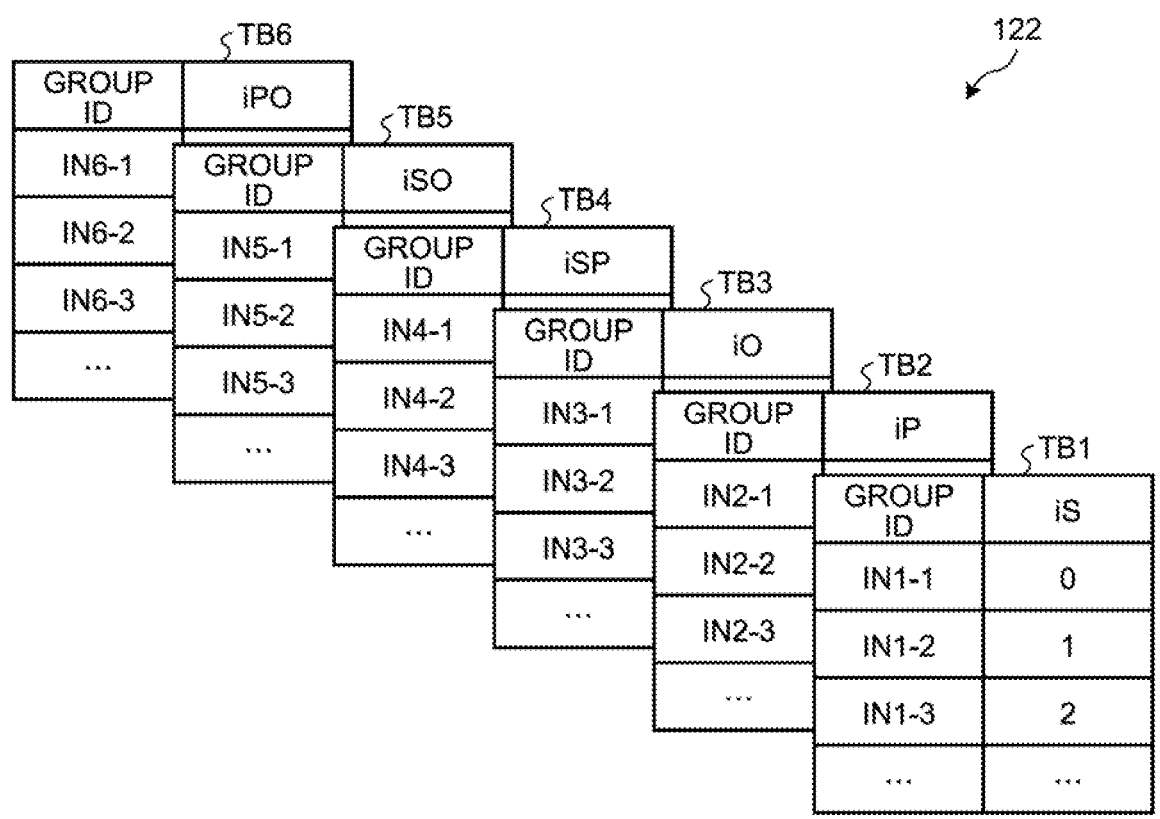
FIG. 5 is a diagram illustrating an example of a reference information storage unit according to the embodiment.

The reference information storage unit 122 according to the embodiment stores therein various kinds of information used to refer to the triple information stored in the triple information storage unit 121. FIG. 5 is a diagram illustrating an example of a reference information storage unit according to the embodiment. For example, the reference information storage unit 122 stores, in each of the tables, the specific information associated with each of the combinations of the subjects, the predicates, and the objects. In the example illustrated in FIG. 5, the reference information storage unit 122 stores the specific information associated with each of the six combinations of "iS", "iP", "iO", "iSP", "iSO", and "iPO". In the example illustrated in FIG. 5, the reference information storage unit 122 stores the specific information associated with each of the combinations of, for example, the first table TB1 to the sixth table TB6.

For example, the first table TB1 has items, such as "group ID" and "iS". Namely, the first table TB1 stores therein the specific information associated with the triple information group having a common subject. Furthermore, for example, the second table TB2 has items, such as "group ID" and "iP". Namely, the second table TB2 stores therein the specific information associated with the triple information group having a common predicate. Furthermore, for example, the third table TB3 has items, such as "group ID" and "iO". Namely, the third table TB3 stores therein the specific information associated with the triple information group having a common object.

For example, the fourth table TB4 has items, such as "group ID" and "iSP". Namely, the fourth table TB4 stores therein the specific information associated with the triple information group having common subject and predicate. Furthermore, for example, the fifth table TB5 has items, such as "group ID" and "iSO". Namely, the fifth table TB5 stores therein the specific information associated with the triple information group having common subject and object. Furthermore, for example, the sixth table TB6 has items, such as "group ID" and "iPO". Namely, the sixth table TB6 stores therein the specific information associated with the triple information group having common predicate and object.

For example, the "group ID" in the first table TB1 indicates the identification information for identifying the specific information associated with the triple information group having a common subject. Furthermore, the "group ID" may also be a predetermined index, such as the address of an array, or the like. Furthermore, for example, "iS" in the first table TB1 indicates the specific information associated with the corresponding group ID. In the example illustrated in FIG. 5, "iS" in the first table TB1 stores therein the "ID" that is the identification information of one piece of the triple information in the triple information group having a common subject.

In the example illustrated in FIG. 5, the ID "0" is stored in "iS" associated with the group ID "IN1-1". In this way, the example illustrated in FIG. 5 indicates that, from among the pieces of the triple information T0 to T15 stored in the triple information storage unit 121 (see FIG. 4), the triple information group that includes therein the triple information (triple information T0) identified by the ID "0" is included in the triple information group having a common subject.

Furthermore, in the example illustrated in FIG. 5, the ID "1" is stored in "iS" associated with the group ID "IN1-2". In this way, the example illustrated in FIG. 5 indicates that, from among the pieces of the triple information T0 to T15 stored in the triple information storage unit 121 (see FIG. 4), the triple information group that includes therein the triple information (triple information T1) identified by the ID "1" is included in the triple information group having a common subject.

Furthermore, in the example illustrated in FIG. 5, the ID "2" is stored in the group ID "IN1-3". In this way, the example illustrated in FIG. 5 indicates that, from among the pieces of the triple information T0 to T15 stored in the triple information storage unit 121 (see FIG. 4), the triple information group that includes therein the triple information (triple information T2) identified by the ID "2" is included in the triple information group having a common subject.

Furthermore, the reference information storage unit 122 is not limited to the unit described above and may also store various kinds of information in accordance with purposes. For example, the reference information storage unit 122 may also be configured by the structure of connection array. A description thereof will be described in detail later.

Control Unit 130

A description will be given here by referring back to FIG. 3. The control unit 130 is a controller and is implemented by, for example, a central processing unit (CPU), a micro processing unit (MPU), or the like, executing various kinds of programs (corresponding to an example of a creating program (a generating program)), which are stored in a storage device in the creating device 100, by using a RAM as a work area. Furthermore, the control unit 130 is a controller and is implemented by, for example, an integrated circuit, such as an application specific integrated circuit (ASIC), a field programmable gate array (FPGA), or the like.

As illustrated in FIG. 3, the control unit 130 includes an acquiring unit 131, a creating unit 132, an extracting unit 133, and a providing unit 134 and implements or executes the function or the operation of the information processing described below. Furthermore, the internal configuration of the control unit 130 is not limited to the configuration illustrated in FIG. 3 and another configuration may also be used as long as the configuration in which the information processing described below is performed is used.

Acquiring Unit 131

The acquiring unit 131 acquires various kinds of information. For example, the acquiring unit 131 various kinds of information from the triple information storage unit 121, the reference information storage unit 122, or the like. Furthermore, the acquiring unit 131 may also acquire various kinds of information from an external information processing apparatus. Furthermore, the acquiring unit 131 may also acquire information related to each of the pieces of the triple information from the information providing device 50.

For example, the acquiring unit 131 acquires a plurality of triple information indicating the relationship related to the three types of elements. For example, the acquiring unit 131 acquires, from the triple information storage unit 121, a plurality of pieces of the triple information indicating the relationship related to the three types of elements.

For example, the acquiring unit 131 acquires the information related to designation of one or more elements out of the three types of elements. In the example illustrated in FIG. 6, the acquiring unit 131 acquires query information QE21 from the terminal device 10 used by a user U1.

Creating Unit 132

The creating unit 132 creates various kinds of information. For example, the creating unit 132 creates, from among a plurality of the triple information acquired by the acquiring unit 131, the association information that associates the triple information group having a predetermined relationship related to the three types of elements.

For example, the creating unit 132 creates a plurality of pieces of association information associated with each of multiple combinations including one or more elements out of the three types of elements. Furthermore, for example, the creating unit 132 creates, for each combination, a plurality of pieces of association information that associates the triple information group associated with the element that is included in a corresponding combination. Furthermore, for example, the creating unit 132 creates, for each triple information group, the information related to the circular linked list that connects the triple information included in each of the triple information groups. Furthermore, for example, the creating unit 132 creates, for each triple information group, the information related to the circular linked list by associating, for each triple information group, one of the pieces of the triple information included in the triple information group with the other one of the pieces of the triple information included in the triple information group.

For example, if the triple information having the subject common to the subject of the triple information T1 is not present in the triple information in which the association information is created before the process is performed on the triple information T1, the creating unit 132 creates a new circular linked list including the triple information T1. For example, if the triple information having the predicate common to the predicate of the triple information T1 is present in the triple information in which the association information is created before the process is performed on the triple information T1, the creating unit 132 creates the association information so as to add the triple information T1 to the circular linked list of the triple information group that includes therein the triple information. In the example illustrated in FIG. 1, regarding the combination "iP", the creating unit 132 creates the circular linked list that connects the triple information T0 and the triple information T1. In the example illustrated in FIG. 1, regarding the combination "iO", the creating unit 132 creates the circular linked list that connects the triple information T0 and the triple information T1. In the example illustrated in FIG. 1, regarding the combination "iPO", the creating unit 132 creates the circular linked list that connects the triple information T0 and the triple information T1.

In the example illustrated in FIG. 1, the creating unit 132 creates the association information indicated by the triple information storage unit 121-4 illustrated in FIG. 1 or creates the reference information indicated by the reference information storage unit 122-4 illustrated in FIG. 1. For example, regarding 16 pieces of the triple information, i.e., the triple information T1 to the triple information T15, indicated by the triple information storage unit 121-4 illustrated in FIG. 1, by repeatedly creating the association information or the like, the creating unit 132 sequentially creates the association information or the like of the pieces of the triple information T0 to T15.

For example, the creating unit 132 creates list information including information that specifies one piece of the triple information selected from each of the triple information groups. For example, the creating unit 132 creates list information related to the triple information group except for the triple information groups associated with the combinations that include all of the three types of elements.

In the example illustrated in FIG. 1, the creating unit 132 creates the association information indicated by the triple information storage unit 121-4 illustrated in FIG. 1 or the reference information indicated by the reference information storage unit 122-4 illustrated in FIG. 1.

Furthermore, for example, the creating unit 132 creates, as the list information, the information related to the associative array including entry information in which one piece of the triple information selected from each of the triple information groups is used as a key and the identification information of the selected triple information is used as a value. Furthermore, for example, the creating unit 132 creates the information related to a search order of each of the pieces of the triple information used at the time of searching the plurality of pieces of the triple information by sequentially determining, from the upper level, the order of the pieces of the triple information such that the triple information groups that include the pieces of the triple information whose order has been determined do not overlap. Furthermore, these points will be described in detail later.

Extracting Unit 133

The extracting unit 133 extracts various kinds of information. For example, the extracting unit 133 extracts triple information. For example, the extracting unit 133 extracts the triple information group associated with the information related to the designation of the element acquired by the acquiring unit 131. For example, the extracting unit 133 extracts a triple information group based on the designation related to one or more elements out of the three types of elements.

In the example illustrated in FIG. 6, the extracting unit 133 extracts, from the reference information storage unit 122, the specific information associated with the query information QE21 acquired from the terminal device 10. In the example illustrated in FIG. 6, because the element corresponding to the search target is the subject, the extracting unit 133 extracts the specific information associated with the query information QE21 from the first table TB1 associated with the combination "iS" in the reference information storage unit 122. For example, the extracting unit 133 extracts, as the specific information, the ID that identifies the triple information in which the subject is "<Leibniz>" from the first table TB1. Specifically, the extracting unit 133 extracts, as the specific information, the ID "3" that identifies the triple information T3 in which the subject is "<Leibniz>" from the first table TB1. For example, the extracting unit 133 extracts the specific information by comparing the subject of the triple information associated with the ID stored in the first table TB1 with "<Leibniz>" included in the query information QE21.

Furthermore, in the example illustrated in FIG. 6, the extracting unit 133 extracts, from the triple information storage unit 121, the triple information group associated with the query by using the specific information extracted at Step S22. For example, the extracting unit 133 extracts, from the triple information storage unit 121, the triple information group associated with the query information QE21 by using the ID "3" that is the extracted specific information.

In the example illustrated in FIG. 6, the extracting unit 133 extracts all of the pieces of the triple information having the subject of "<Leibniz>" by tracing the circular linked list from the triple information T3 specified by the ID "3" that is the specific information. For example, the extracting unit 133 extracts all of the pieces of the triple information having the subject of "<Leibniz>" by sequentially tracing from the triple information T14 identified by the ID "14" stored in "iS" associated with the ID "3".

Figure 7:
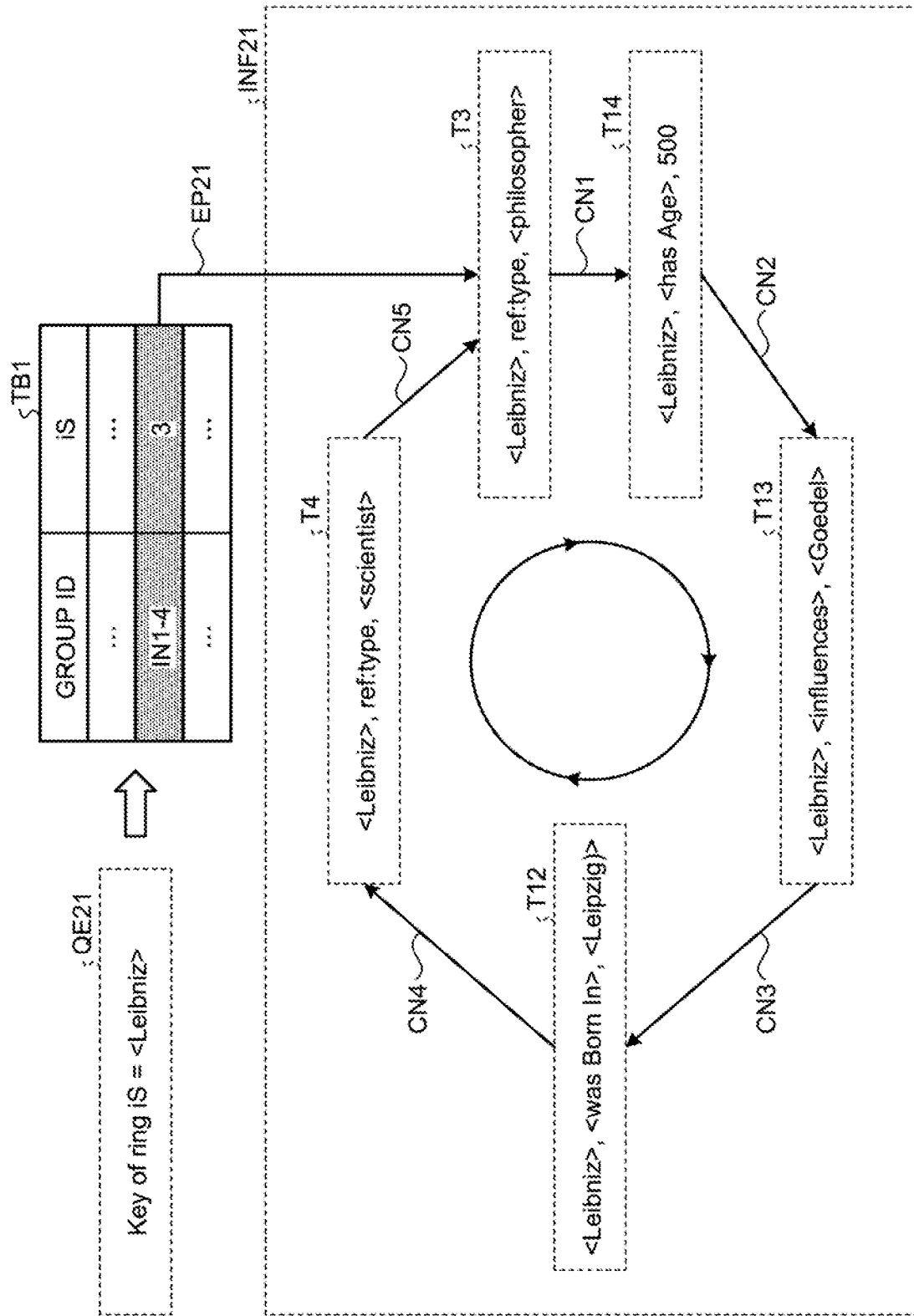
FIG. 7 is a schematic diagram illustrating extraction of information associated with a query according to the embodiment.

In the example illustrated in FIG. 7, the extracting unit 133 extracts, as the triple information group associated with the query information QE21, the pieces of the triple information T4 and T12 to T14 obtained by tracing from the triple information T3 using pieces of connection information CN1 to CN5. For example, the extracting unit 133 extracts, as the triple information group associated with the query information QE21, the pieces of the triple information T3, T4, and T12 to T14 identified by the IDs "3", "4", "12", "13", and "14", respectively.

In the example illustrated in FIG. 8, the extracting unit 133 extracts, from the reference information storage unit 122, the specific information associated with the query information QE31 acquired from the terminal device 10. In the example illustrated in FIG. 8, because the elements corresponding to the search target are the predicate and the object, the extracting unit 133 extracts the specific information associated with the query information QE31 from the sixth table TB6 associated with the combination "iPO" in the reference information storage unit 122. For example, the extracting unit 133 extracts, as the specific information from the sixth table TB6, the ID that identifies the triple information in which the value of the predicate is "rdf:type" and the value of the object is "<scientist>".

Specifically, the extracting unit 133 extracts, as the specific information from the sixth table TB6, the ID "4" that identifies the triple information T4 in which the value of the predicate is "rdf:type" and the value of the object is "<scientist>". For example, the extracting unit 133 extracts the specific information by comparing the predicate of the triple information associated with the ID stored in the sixth table TB6 with "rdf:type" included in the query information QE31 and by comparing the object of the triple information associated with the ID stored in the sixth table TB6 with "<scientist>" included in the query information QE31.

Furthermore, in the example illustrated in FIG. 8, the extracting unit 133 extracts the triple information group associated with the query from the triple information storage unit 121 by using the specific information extracted at Step S32. For example, the extracting unit 133 extracts the triple information group associated with the query information QE31 from the triple information storage unit 121 by using the ID "4" that is the extracted specific information.

In the example illustrated in FIG. 8, the extracting unit 133 extracts all of the pieces of the triple information in which the value of the predicate is "rdf:type" and the value of the object is "<scientist>" by tracing the circular linked list from the triple information T3 specified by the ID "4" that is the specific information. For example, the extracting unit 133 extracts all of the pieces of the triple information in which the value of the predicate is "rdf:type" and the value of the object is "<scientist>" by sequentially tracing from the triple information T5 identified by the ID "5" stored in "iPO" associated with the ID "4".

Figure 9:
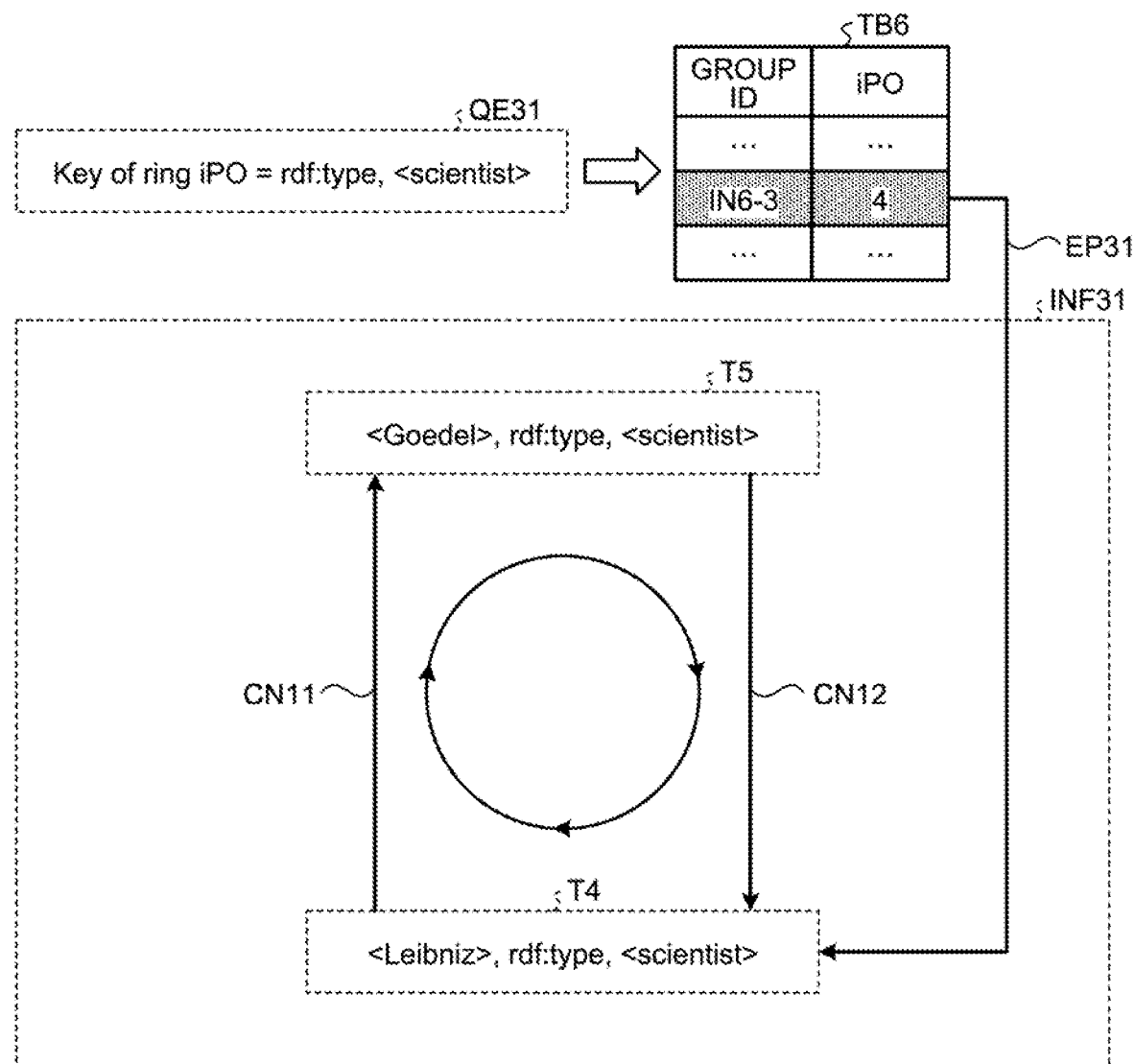
FIG. 9 is a schematic diagram illustrating extraction of information associated with the query according to the embodiment.

In the example illustrated in FIG. 9, the extracting unit 133 extracts, as the triple information group associated with the query information QE31, the pieces of the triple information T4 and T5 traced from the triple information T4 by using the pieces of connection information CN11 and CN12. For example, the extracting unit 133 extracts the pieces of the triple information T4 and T5 identified by the respective IDs "4" and "5" as the triple information group associated with the query information QE31.

Providing Unit 134

The providing unit 134 provides various kinds of information. For example, the providing unit 134 provides various kinds of information to the terminal device 10. For example, the providing unit 134 provides the triple information associated with the query as a search result. For example, the providing unit 134 provides, to the terminal device 10, the triple information included in the triple information group extracted from the triple information storage unit 121 by the extracting unit 133 based on the association information. In the example illustrated in FIG. 6, the providing unit 134 provides the triple information extracted by the extracting unit 133 to the terminal device 10 as a search result. In the example illustrated in FIG. 6, the providing unit 134 provides the pieces of the triple information T3, T4, and T12 to T14 indicated by a triple information group RS21 to the terminal device 10 as the search result. Furthermore, in the example illustrated in FIG. 8, the providing unit 134 provides the pieces of the triple information T4 and T5 indicated by the triple information group RS31 to the terminal device 10 as the search result.

4. Providing Information

In the following, providing information performed by the creating system 1 according to the embodiment will be described with reference to FIGS. 6 to 9. FIGS. 6 and 8 are diagrams each illustrating an example of a process of providing information associated with a query according to the embodiment. FIGS. 7 and 9 are schematic diagrams each illustrating extraction of information associated with a query according to the embodiment.

First, an example of a case of acquiring a query related to the subject is described with reference to FIGS. 6 and 7.

First, the creating device 100 acquires a query from the terminal device 10 used by the user U1 (Step S21). In the example illustrated in FIG. 6, the creating device 100 acquires the query information QE21 from the terminal device 10. The example illustrated in FIG. 6 indicates that the query information QE21 includes therein character string information of "Key of ring iS=<Leibniz>"; indicates that the element corresponding to the search target is "S", i.e., the subject; and indicates that the value of the subject is "<Leibniz>". Furthermore, the full width space in this application may also be replaced by a half width.

The creating device 100 that has acquired the query information QE21 from the terminal device 10 extracts the specific information associated with the query information QE21 from the reference information storage unit 122 (Step S22). In the example illustrated in FIG. 6, because the element that becomes the search target is the subject, the creating device 100 extracts the specific information associated with the query information QE21 from the first table TB1 associated with the combination of "iS" in the reference information storage unit 122. For example, the creating device 100 extracts, as the specific information, the ID that identifies the triple information in which the subject is "<Leibniz>" from the first table TB1. Specifically, the creating device 100 extracts, as the specific information, the ID "3" that identifies the triple information T3 in which the subject is "<Leibniz>" from the first table TB1. For example, the creating device 100 extracts the specific information by comparing the subject of the triple information associated with the ID stored in the first table TB1 with "<Leibniz>" included in the query information QE21.

Furthermore, the creating device 100 may also store, in the first table TB1 to the sixth table TB6, a value of the corresponding ID in the reference information storage unit 122 by associating the value with the corresponding ID. For example, the creating device 100 may also store "<Leibniz>" that is the subject of the triple information T3 in the first table TB1, the fourth table TB4, or the fifth table TB5 by associating "<Leibniz>" with the ID "3". For example, the creating device 100 may also store "<scientist>" that is the object of the triple information T4 in the third table TB3, the fifth table TB5, or the sixth table TB6 by associating "<scientist>" with the ID "4".

Then, the creating device 100 extracts, from the triple information storage unit 121, the triple information group associated with the query by using the specific information extracted at Step S22 (Step S23). For example, the creating device 100 extracts, from the triple information storage unit 121, the triple information group associated with the query information QE21 by using the ID "3" that is the extracted specific information.

In the example illustrated in FIG. 6, the creating device 100 extracts all of the pieces of the triple information in which the subject is "<Leibniz>" by tracing the circular linked list starting from the triple information T3 specified by the ID "3" that is the specific information. For example, the creating device 100 extracts all of the pieces of the triple information in which the subject is "<Leibniz>" by sequentially tracing from the triple information T14 identified by the ID "14" that is stored in "iS" associated with the ID "3". This point will be described with reference to FIG. 7.

As illustrated in FIG. 7, in accordance with the query information QE21, the creating device 100 extracts the ID "3" as the specific information in the first table TB1 and specifies, as indicated by an entry point EP21 illustrated in FIG. 7, the triple information T3 associated with the ID "3". Consequently, the creating device 100 specifies one piece of the triple information T3, in the triple information group, in which the subject is "<Leibniz>", as indicated by circular linked list information INF21 illustrated in FIG. 7. As described above, in the triple information storage unit 121 illustrated in FIG. 6, because the ID "14" is stored in "iS" associated with the ID "3", the creating device 100 can reach the triple information T14 from the triple information T3, as indicated by the connection information CN1 illustrated in FIG. 7.

Furthermore, in the triple information storage unit 121 illustrated in FIG. 6, because the ID "13" is stored in "iS" associated with the ID "14", the creating device 100 can reach the triple information T13 from the triple information T14, as indicated by connection information CN2 illustrated in FIG. 7. Furthermore, in the triple information storage unit 121 illustrated in FIG. 6, because the ID "12" is stored in "iS" associated with the ID "13", the creating device 100 can reach the triple information T12 from the triple information T13, as indicated by the connection information CN3 illustrated in FIG. 7. Furthermore, in the triple information storage unit 121 illustrated in FIG. 6, because the ID "4" is stored in "iS" associated with the ID "12", the creating device 100 can reach the triple information T4 from the triple information T12, as indicated by the connection information CN4 illustrated in FIG. 7.

Furthermore, in the triple information storage unit 121 illustrated in FIG. 6, because the ID "3" is stored in "iS" associated with the ID "4", the creating device 100 can reach the triple information T3 from the triple information T4, as indicated by the connection information CN5 illustrated in FIG. 7. Here, by reaching the triple information T3 from the triple information T4, as indicated by the connection information CN5 illustrated in FIG. 7, the trace returns to the triple information T3 specified by the entry point EP21 based on the specific information that is extracted from the first table TB1, and therefore, this corresponds to making a round of the circular linked list.

Consequently, the creating device 100 extracts, as the triple information group associated with the query information QE21, the pieces of the triple information T4 and T12 to T14 traced starting from the triple information T3 by using the pieces of the connection information CN1 to CN5. In this way, in the example illustrated in FIG. 6, the creating device 100 extracts, as the triple information group associated with the query information QE21, the pieces of the triple information T3, T4, and T12 to T14 that are identified by the IDs "3", "4", "12", "13", and "14", respectively.

Then, the creating device 100 provides the triple information extracted at Step S23 to the terminal device 10 as the search result (Step S24). In the example illustrated in FIG. 6, the creating device 100 provides the pieces of the triple information T3, T4, and T12 to T14, as indicated by the triple information group RS21, to the terminal device 10 as the search result. In this way, the creating device 100 can specify, by using the reference information, one piece of the triple information belonging to the circular linked list associated with the query; reduce an increase in processing time by tracing the circular linked list from the specified triple information; and provide the triple information associated with the query.

First, an example of a case of acquiring a query related to the subject is described with reference to FIGS. 8 and 9.

First, the creating device 100 acquires a query from the terminal device 10 used by the user U1 (Step S31). In the example illustrated in FIG. 8, the creating device 100 acquires the query information QE31 from the terminal device 10. The example illustrated in FIG. 8 indicates that the query information QE31 includes therein character string information of "Key of ring iPO=rdf:type, <scientist>"; indicates that the element corresponding to the search target is "PO", i.e., the predicate and the object; and indicates that the value of the predicate is "rdf:type" and the value of the object is "<scientist>".

The creating device 100 that has acquired the query information QE31 from the terminal device 10 extracts the specific information associated with the query information QE31 from the reference information storage unit 122 (Step S32). In the example illustrated in FIG. 8, because the elements that become the search target are the predicate and the object, the creating device 100 extracts the specific information associated with the query information QE31 from the sixth table TB6 associated with the combination "iPO" in the reference information storage unit 122. For example, the creating device 100 extracts, as the specific information, the ID that identifies the triple information in which the value of the predicate is "rdf:type" and the value of the object is "<scientist>" from the sixth table TB6.

Specifically, the creating device 100 extracts, as the specific information, the ID "4" that identifies the triple information T4 in which the value of the predicate is "rdf:type" and the value of the object is "<scientist>" from the sixth table TB6. For example, the creating device 100 extracts the specific information by comparing the predicate of the triple information associated with the ID stored in the sixth table TB6 with "rdf:type" included in the query information QE31 and by comparing the object of the triple information associated with the ID stored in the sixth table TB6 with "<scientist>" included in the query information QE31.

Then, the creating device 100 extracts, from the triple information storage unit 121, the triple information group associated with the query by using the specific information extracted at Step S32 (Step S33). For example, the creating device 100 extracts, from the triple information storage unit 121, the triple information group associated with the query information QE31 by using the ID "4" that is the extracted specific information.

In the example illustrated in FIG. 8, the creating device 100 extracts all of the pieces of the triple information in which the value of the predicate is "rdf:type" and the value of the object is "<scientist>" by tracing the circular linked list from the triple information T4 specified by the ID "4" that is the specific information. For example, the creating device 100 extracts all of the pieces of the triple information in which the value of the predicate is "rdf:type" and the value of the object is "<scientist>" by sequentially tracing from the triple information T5 identified by the ID "5" that is stored in "iPO" associated with the ID "4". This point will be described with reference to FIG. 9.

As illustrated in FIG. 9, in accordance with the query information QE31, the creating device 100 extracts the ID "4" as the specific information in the sixth table TB6 and specifies, as indicates by an entry point EP31 illustrated in FIG. 9, the triple information T4 associated with the ID "4". Consequently, the creating device 100 specifies one piece of the triple information T4, in the triple information group, in which the value of the predicate is "rdf:type" and the value of the object is "<scientist>", as indicated by circular linked list information INF31 illustrated in FIG. 9. As described above, in the triple information storage unit 121 illustrated in FIG. 8, because the ID "5" is stored in "iPO" associated with the ID "4", the creating device 100 can reach the triple information T5 from the triple information T4, as indicated by the connection information CN11 illustrated in FIG. 9.

Furthermore, in the triple information storage unit 121 illustrated in FIG. 8, because the ID "4" is stored in "iPO" associated with the ID "5", the creating device 100 can reach the triple information T4 from the triple information T5, as indicated by the connection information CN12 illustrated in FIG. 9. Here, by reaching the triple information T4 from the triple information T5, as indicated by the connection information CN12 illustrated in FIG. 9, the trace returns to the triple information T4 specified by the entry point EP31 based on the specific information that is extracted from the sixth table TB6, and therefore, this corresponds to making a round of the circular linked list.

Consequently, the creating device 100 extracts, as the triple information group associated with the query information QE31, the pieces of the triple information T4 and T5 traced starting from the triple information T4 by using the pieces of the connection information CN11 and CN12. In this way, in the example illustrated in FIG. 8, the creating device 100 extracts, as the triple information group associated with the query information QE31, the pieces of the triple information T4 and T5 that are identified by the IDs "4" and "5", respectively.

Then, the creating device 100 provides the triple information extracted at Step S33 to the terminal device 10 as the search result (Step S34). In the example illustrated in FIG. 8, the creating device 100 provides the pieces of the triple information T4 and T5, as indicated by the triple information group RS31, to the terminal device 10 as the search result. In this way, the creating device 100 can specify, by using the reference information, one piece of the triple information belonging to the circular linked list associated with the query; reduce an increase in processing time by tracing the circular linked list from the specified triple information; and provide the triple information associated with the query.

5. Flow of the Creating Process

Figure 10:
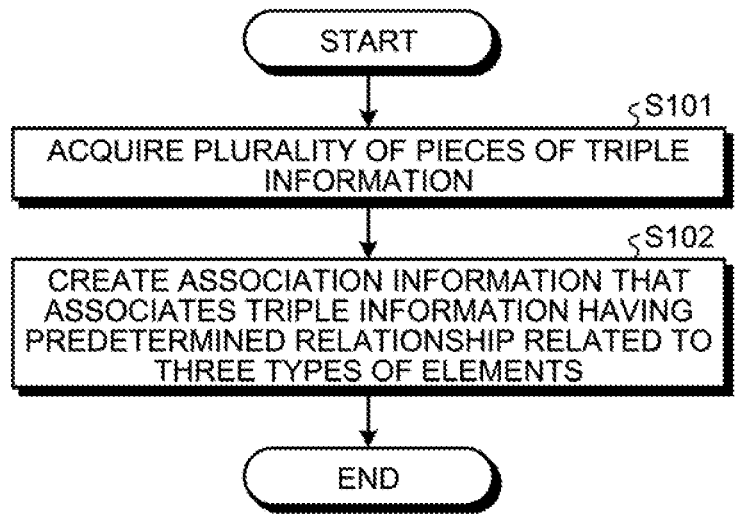
FIG. 10 is a flowchart illustrating an example of the creating process according to the embodiment.

In the following, the flow of the creating process performed by the creating system 1 according to the embodiment will be described with reference to FIG. 10. FIG. 10 is a flowchart illustrating an example of the creating process according to the embodiment.

As illustrated in FIG. 10, the creating device 100 acquires a plurality of pieces of triple information (Step S101). In the example illustrated in FIG. 1, the creating device 100 acquires 16 pieces of the triple information associated with the pieces of the corresponding triple information T0 to T15, as indicated by the triple information storage unit 121.

Then, the creating device 100 creates the association information that associates the triple information having a predetermined relationship related to the three types of elements (Step S102). For example, the creating device 100 creates a circular linked list as the association information. In the example illustrated in FIG. 1, the creating device 100 creates the association information, as indicated by the triple information storage unit 121-4 illustrated in FIG. 1 or the reference information as indicated by the reference information storage unit 122-4 illustrated in FIG. 1.

6. Flow of a Process of Providing Information

Figure 11:
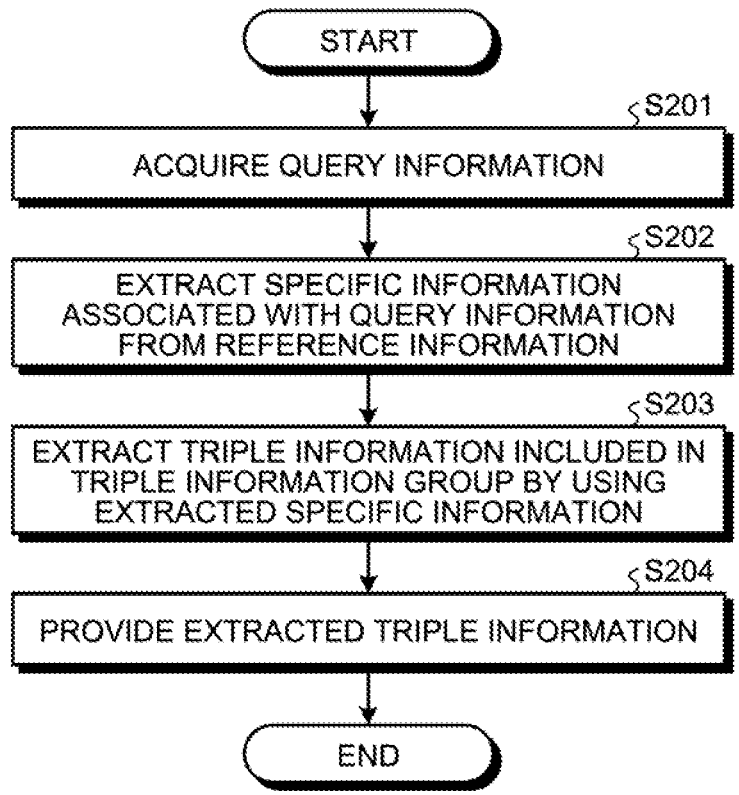
FIG. 11 is a flowchart illustrating an example of the process of providing information associated with the embodiment.

In the following, the flow of a process of providing information performed by the creating system 1 according to the embodiment will be described with reference to FIG. 11. FIG. 11 is a flowchart illustrating an example of the process of providing information associated with the embodiment.

As illustrated in FIG. 11, the creating device 100 acquires the query information (Step S201). In the example illustrated in FIG. 6, the creating device 100 acquires the query information QE21 from the terminal device 10 used by the user U1.

Then, the creating device 100 extracts the specific information associated with the query information from the reference information (Step S202). In the example illustrated in FIG. 6, the creating device 100 extracts, from the reference information storage unit 122, the specific information associated with the query information QE21 acquired from the terminal device 10.

Then, the creating device 100 extracts the triple information included in the triple information group by using the extracted specific information (Step S203). In the example illustrated in FIG. 6, the creating device 100 extracts, as the triple information group associated with the query information QE21, the pieces of the triple information T3, T4, and T12 to T14 identified by the IDs "3", "4", "12", "13", and "14", respectively.

Then, the creating device 100 provides the extracted triple information (Step S204). In the example illustrated in FIG. 6, the creating device 100 provides the pieces of the triple information T3, T4, and T12 to T14 as indicated by the triple information group RS21 to the terminal device 10 as the search result.

7. Another Configuration Example of the Reference Information Storage Unit

The creating device 100 is not limited to the embodiment described above and may also stores therein various kinds of information by using various kinds of configuration. This point will be described based on FIGS. 12 and 13. Furthermore, components having the same configuration as those described in the embodiment are denoted by the same reference numerals and descriptions thereof will be omitted.

Figure 12:
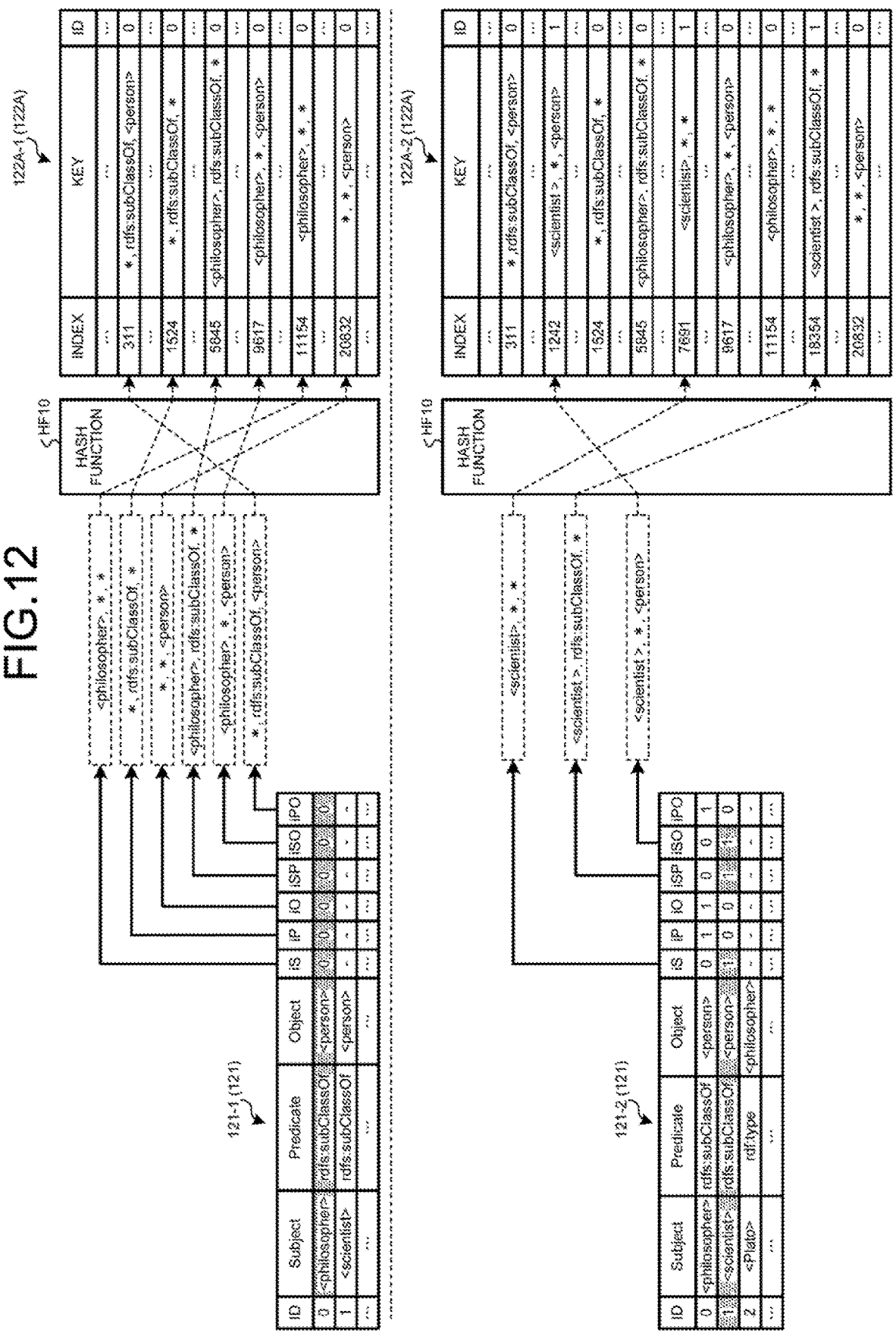
FIG. 12 is a diagram illustrating another configuration example of the reference information storage unit according to the embodiment.

For example, the creating device 100 may also store the reference information by using various types of associative array, such as a hash table, or the like. Namely, instead of the reference information storage unit 122 illustrated in FIG. 5, the creating device 100 may also include a reference information storage unit 122A, as illustrated in FIG. 13. This point will be described with reference to FIGS. 12 and 13. FIG. 12 is a diagram illustrating another configuration example of the reference information storage unit according to the embodiment. FIG. 13 is a diagram illustrating an example of extracting information performed by using an associative array according to the embodiment. Furthermore, the triple information storage unit 121-1 and the triple information storage unit 121-2 illustrated in FIG. 12 are the same as those illustrated in FIG. 12 illustrated in FIG. 1.

Furthermore, in the example illustrated in FIG. 12, the reference information storage unit 122A is described as reference information storage units 122A-1 and 122A-2 in accordance with an update of the reference information stored in the reference information storage unit 122A. Furthermore, the reference information storage units 122A-1 and 122A-2 are the same reference information storage unit 122. Furthermore, in a description below, the reference information storage units 122A-1 and 122A-2 are referred to as the reference information storage unit 122A as long as the reference information storage units 122A-1 and 122A-2 need not be distinguished.

In the example illustrated in FIGS. 12 and 13, the creating device 100 uses a predetermined hash function HF10. For example, the creating device 100 uses the hash value output by the hash function HF10 if a predetermined key is input as the index and stores the ID associated with the key in the reference information storage unit 122A. Furthermore, the index mentioned here may also be a subscript of an array, the address of a memory, or the like.

In FIG. 12, as indicated by the triple information storage unit 121-1 illustrated in FIG. 12, the creating device 100 stores, in "iS", "iP", "iO", "iSP", "iSO", and "iPO" associated with the triple information T0, the ID "0" that is the identification information of the own triple information T0. Because only the triple information T0 is targeted for the creating process of the association information, the creating device 100 stores, in "iS", "iP", "iO", "iSP", "iSO", and "iPO", the ID "0" that is the identification information of the own triple information T0.

Furthermore, as illustrated in FIG. 12, regarding the association information that becomes a new circular linked list added to the triple information storage unit 121, the creating device 100 adds the ID of the identification information of the triple information to the reference information storage unit 122A-1. Specifically, from among the six combinations of "iS", "iP", "iO", "iSP", "iSO", and "iPO", the creating device 100 stores, in the reference information storage unit 122A-1, the ID that is the identification information of the triple information by associating the ID with the key associated with the combination in which the association information constituting the new circular linked list is added.

In the example illustrated in FIG. 12, as indicated by the reference information storage unit 122A-1, the creating device 100 stores, in the reference information storage unit 122A-1, the key associated with the combination of "iS" related to the triple information T0, i.e., the key in which the subject is the subject of the triple information T0. Specifically, the creating device 100 stores, in the reference information storage unit 122A-1, the key "<philosopher>,*,*" having the same subject as that of the triple information T0. Furthermore, the keys are arranged in the order of the subject, the predicate, and the object with a ", (comma)" therebetween as a delimiter. For example, if the keys are "X, Y, and Z", this indicates that the subject is "X", the predicate is "Y", and the object is "Z". Furthermore, the symbol "*" illustrated in FIGS. 12 and 13 indicates arbitrary information (character string). Namely, the keys of "<philosopher>,*,*" indicate that any information may be possible for the predicate and the object as long as the subject is "<philosopher>".

In the example illustrated in FIG. 12, the creating device 100 acquires the hash value "11154" by inputting the keys "<philosopher>,*,*" to the hash function HF10. Consequently, the creating device 100 stores the information in which the keys "<philosopher>,*,*" and the ID "0" are associated with the index "11154" in the reference information storage unit 122A-1.

Furthermore, in the example illustrated in FIG. 12, the creating device 100 acquires the hash value "1524" by inputting the keys "*,rdfs:subClassOf,*" to the hash function HF10. Consequently, the creating device 100 stores the information in which the keys "*,rdfs:subClassOf,*" and the ID "0" are associated with the index "1524" in the reference information storage unit 122A-1. Furthermore, in the example illustrated in FIG. 12, the creating device 100 acquires the hash value "20832" by inputting the keys "*,*,<person>" to the hash function HF10. Consequently, the creating device 100 stores the information in which the keys "*,*,<person>" and the ID "0" are associated with the index "20832" in the reference information storage unit 122A.

Furthermore, in the example illustrated in FIG. 12, the creating device 100 acquires the hash value "5845" by inputting the keys "<philosopher>,rdfs:subClassOf,*" to the hash function HF10. Consequently, the creating device 100 stores the information in which the keys "<philosopher>,rdfs:subClassOf,*" and the ID "0" are associated with the index "5845" in the reference information storage unit 122A-1.

Furthermore, in the example illustrated in FIG. 12, the creating device 100 acquires the hash value "9617" by inputting the keys "<philosopher>,*,<person>" to the hash function HF10. Consequently, the creating device 100 stores the information in which the keys "<philosopher>,*,<person>" and the ID "0" associated with the index "9617" in the reference information storage unit 122A-1.

Furthermore, in the example illustrated in FIG. 12, the creating device 100 acquires the hash value "311" by inputting the keys "*,rdfs:subClassOf,<person>" to the hash function HF10. Thus, the creating device 100 stores the information in which the keys "*,rdfs:subClassOf,<person>" and the ID "0" are associated with the index "311" in the reference information storage unit 122A-1.

Furthermore, in FIG. 12, because the predicate and the object of the triple information T0 and the triple information T1 are the same, the creating device 100 creates, regarding the combination of "iP", "iO", and "iPO", as indicated by the triple information storage unit 121-2 illustrated in FIG. 12, the circular linked list that connects the triple information T0 and the triple information T1.

In contrast, because the subject "<scientist>" of the triple information T1 is different from the subject "<philosopher>" of the triple information T0, the creating device 100 sets the combination of "iS", "iSP", and "iSO" to the information belonging to the circular linked list that is different from that of the triple information T1 and the triple information T0. For example, as indicated by the triple information storage unit 121-2 illustrated in FIG. 12, the creating device 100 stores "1" in "iS", "iSP", and "iSO" associated with the triple information T1.

Furthermore, as illustrated in FIG. 12, regarding the association information corresponding to a new circular linked list added to the triple information storage unit 121, the creating device 100 adds the ID that is the identification information of the triple information to the reference information storage unit 122A-2. Specifically, the creating device 100 stores the ID that is the identification information of the triple information in the reference information storage unit 122A-2 by associating the ID with the key associated with the combination in which the association information corresponding to a new circular linked list is added from among the six combinations of "iS", "iP", "iO", "iSP", "iSO", and "iPO".

In the example illustrated in FIG. 12, as indicated by the reference information storage unit 122A-2, the creating device 100 stores, in the reference information storage unit 122A-2, the key associated with the combination "iS" related to the triple information T1, i.e., the key having the same subject as that of the triple information T1. Specifically, the creating device 100 stores, in the reference information storage unit 122A-2, the keys "<scientist>,*,*" having the same subject as that of the triple information T1.

In the example illustrated in FIG. 12, the creating device 100 acquires the hash value "7691" by inputting the keys "<scientist>,*,*" to the hash function HF10. Consequently, the creating device 100 stores, in the index "7691" in the reference information storage unit 122A-2, the information in which the keys "<scientist>,*,*" are associated with the ID "1".

Furthermore, in the example illustrated in FIG. 12, the creating device 100 acquires the hash value "18354" by inputting the keys "<scientist>,rdfs:subClassOf,*" to the hash function HF10. Consequently, the creating device 100 stores, in the index "18354" in the reference information storage unit 122A-2, the information in which the keys "<scientist>,rdfs:subClassOf,*" are associated with the ID "1".

Furthermore, in the example illustrated in FIG. 12, the creating device 100 acquires the hash value "1242" by inputting the keys "<scientist>,*,<person>" to the hash function HF10. Consequently, the creating device 100 stores, in the index "1242" in the reference information storage unit 122A-2, the information in which the keys "<scientist>,*,<person>" are associated with the ID "1". Consequently, the creating device 100 creates an associative array by storing, in the reference information storage unit 122A-2, the ID corresponding to the identification information of the triple information by associating the ID with the key associated with the combination in which the association information corresponding to a new circular linked list is added. For example, by using a predetermined hash function, the creating device 100 may also create an associative array by associating the key with the ID indicated by the first table TB1 to the sixth table TB6 illustrated in FIG. 5.

Furthermore, in the example described above, a description has been given of a case of storing the ID associated with the key in a single associative array regardless of the combinations of the keys; however, the creating device 100 may also store the ID associated with the key for each of the six combinations. In this case, the creating device 100 may also separately create an associative array for each combination of the element corresponding to the key. For example, as indicated by the first table TB1 to the sixth table TB6 illustrated in FIG. 5, the creating device 100 may also separately form the associative array in accordance with the combinations of the subject, the predicate, and the object, such as "iS", "iP", "iO", "iSP", "iSO", and "iPO".

In the following, extracting information performed by using an associative array will be described with reference to FIG. 13. Furthermore, the processes at Steps S41 and S42 illustrated in FIG. 13 correspond to the processes at Steps S22 and S23, respectively, illustrated in FIG. 6. The processes at Steps S41 and S42 illustrated in FIG. 13 corresponds to the process of specifying one piece of triple information belonging to the circular linked list associated with the query by using the reference information and tracing the circular linked list from the specified triple information. Furthermore, components having the same configuration as those described in the embodiment are denoted by the same reference numerals and descriptions thereof will be omitted.

In the example illustrated in FIG. 13, the creating device 100 acquires the query information QE21 from the terminal device 10. In the example illustrated in FIG. 13, the query information QE21 indicates that the character string information of "Key of ring iS=<Leibniz>" is included; indicates that the element corresponding to the search target is "S", i.e., the subject; and indicates that the value of the subject is "<Leibniz>".

The creating device 100 that has acquired the query information QE21 from the terminal device 10 extracts, from the reference information storage unit 122A, the specific information associated with the query information QE21 (Step S41). In the example illustrated in FIG. 13, because the element that is used as the search target by the query information QE21 is the subject, the creating device 100 creates the keys "<Leibniz>,*,*", as indicated by a key K41. For example, the creating device 100 analyzes the query information QE21 by appropriately using various kinds of conventional technologies of lexical analysis, such as syntax analysis, or the like, thus specifying that, regarding the "Key of ring iS=<Leibniz>", the element corresponding to the search target is the subject and the value of the subject is "<Leibniz>". Consequently, the creating device 100 creates the keys "<Leibniz>,*,*", as indicated by the key K41 illustrated in FIG. 13. Then, the creating device 100 acquires the hash value "6153" by inputting the key K41 to the hash function HF10.

Then, the creating device 100 extracts the ID stored in the index "6153" from the reference information storage unit 122A. Specifically, the creating device 100 extracts, as the specific information from the reference information storage unit 122A, the ID "3" that is stored in association with the keys "<Leibniz>,*,*".

Then, the creating device 100 extracts, from the triple information storage unit 121 by using the specific information extracted at Step S41, the triple information group associated with the query (Step S42). For example, the creating device 100 extracts, by using the ID "3" that is the extracted specific information, the triple information group associated with the query information QE21 from the triple information storage unit 121.

In the example illustrated in FIG. 13, the creating device 100 extracts all of the pieces of the triple information in which the subject is "<Leibniz>" by tracing the circular linked list from the triple information T3 specified by the ID "3" that is the specific information. For example, the creating device 100 extracts all of the pieces of the triple information in which the subject is "<Leibniz>" by sequentially tracing from the triple information T14 identified by the ID "14" stored in "iS" associated with the ID "3". Furthermore, the processes related to this point are the same as those illustrated in FIGS. 6 and 7; therefore, descriptions thereof will be omitted.

In the example illustrated in FIG. 13, the creating device 100 extracts the pieces of the triple information T4 and T12 to T14 as the triple information group associated with the query information QE21 by tracing the circular linked list from the triple information T3. In this way, in the example illustrated in FIG. 13, the creating device 100 extracts, as the triple information group associated with the query information QE21, the pieces of the triple information T3, T4, and T12 to T14 identified by the IDs "3", "4", "12", "13", and "14", respectively. In this way, the creating device 100 can reduce an increase in processing time needed to specify one piece of triple information belonging to the circular linked list associated with the query by storing the reference information by using an associative array and provide the triple information associated with the query. Furthermore, the reference information is not limited to the hash table described above and may also be various kinds of information. For example, the reference information may be a dictionary or the like.

8. Configuration Without Using Reference Information

In the example described above, a case has been described in which the creating device 100 specifies one piece of triple information belonging to the circular linked list by using various kinds of reference information; however, the creating device 100 does not need to use the reference information. In this case, the creating device 100 does not need to include the reference information storage unit 122 nor the reference information storage unit 122A. This point will be described based on FIG. 14. FIG. 14 is a diagram illustrating another configuration example of the triple information storage unit according to the embodiment. Furthermore, components having the same configuration as those described in the embodiment are denoted by the same reference numerals and descriptions thereof will be omitted.

The creating device 100 illustrated in FIG. 14 includes a triple information storage unit 121A instead of the triple information storage unit 121 illustrated in FIG. 4. The triple information storage unit 121A includes the item "next ID (search sequential order)" indicating the search sequential order, which is different from the triple information storage unit 121 according to the embodiment.

For example, the creating device 100 creates the information related to a search order of each of the pieces of the triple information used at the time of searching a plurality of pieces of the triple information by sequentially determining, from the upper level, the order of the pieces of the triple information such that the triple information groups that include the pieces of the triple information whose order has been determined do not overlap. The creating device 100 creates the association information stored in the triple information storage unit 121A or the information related to the search sequential order.

For example, the creating device 100 creates the association information or the information related to the search sequential order in the order from the ID "0" to the ID "15", i.e., in ascending order of the values of the ID. For example, the creating device 100 sequentially creates the association information in the order from the ID "0" to the ID "15" and creates the information related to the search sequential order by setting the search sequential order of the triple information in which a new circular linked list is not created to a later place.

In the example illustrated in FIG. 14, in the process of creating the association information of the triple information T0, because a new circular linked list is created about the combinations of "iS", "iP", "iO", "iSP", "iSO", and "iPO", the creating device 100 sets the search sequential order of the triple information T0 to the first place.

Furthermore, in the example illustrated in FIG. 14, in the process of creating the association information of the triple information T1, because a new circular linked list is created about the combinations of "iS", "iSP", and "iSO", the creating device 100 sets the search sequential order of the triple information T1 to the second place. Furthermore, the creating device 100 stores "1" in the next ID of the ID "0" associated with the triple information T0.

Furthermore, in the example illustrated in FIG. 1, in the process of creating the association information of the triple information T2, because a new circular linked list is created about the combinations of "iS", "iP", "iO", "iSP", "iSO", and "iPO", the creating device 100 sets the search sequential order of the triple information T2 to the third place. Furthermore, the creating device 100 stores "2" in the next ID of the ID "1" associated with the triple information T1.

Furthermore, in the example illustrated in FIG. 14, in the process of creating the association information of the triple information T3, because a new circular linked list is created about the combinations of "iS", "iSP", and "iSO", the creating device 100 sets the search sequential order of the triple information T3 to the fourth place. Furthermore, the creating device 100 stores "3" in the next ID of the ID "2" associated with the triple information T2.

Furthermore, in the example illustrated in FIG. 14, in the process of creating the association information of the triple information T4, because a new circular linked list is created about the combinations of "iS", "iSP", and "iSO", the creating device 100 sets the search sequential order of the triple information T4 to the fifth place. Furthermore, the creating device 100 stores "4" in the next ID of the ID "3" associated with the triple information T3.

Furthermore, in the example illustrated in FIG. 14, in the process of creating the association information of the triple information T5, because the combinations of "iS", "iP", "iO", "iSP", "iSO", and "iPO" of the triple information T5 match one of the combinations of "iS", "iP", "iO", "iSP", "iSO", and "iPO" of the triple information T3 or the triple information T4, the creating device 100 sets the search sequential order related to the triple information T5 to a later place. Furthermore, the example illustrated in FIG. 14 indicates a case in which the search sequential order of the triple information T5 is set to the $16^{th}$ place that is the last search sequential order out of the 16 pieces of the triple information; however, the creating device 100 does not need to attach the search sequential order to the triple information T5.

Furthermore, in the example illustrated in FIG. 14, in the process of creating the association information of the triple information T6, because a new circular linked list is created about the combinations of "iS", "iO", "iSP", "iSO", and "iPO", the creating device 100 sets the search sequential order of the triple information T6 to the sixth place. Furthermore, the creating device 100 stores "6" in the next ID of the ID "4" associated with the triple information T4.

Furthermore, in the example illustrated in FIG. 14, by performing the same process on the remaining pieces of the triple information T7 to T15, the creating device 100 creates the association information indicated by the triple information storage unit 121A or the information related to the search sequential order.

By using the information in the triple information storage unit 121A created described above, the creating device 100 starts a search from the triple information T0 whose search sequential order is first, processes the triple information T4, and then moves to the process of the triple information T6 without processing the triple information T5. Consequently, the creating device 100 can reduce an increase in the processing time needed for the search and provide the triple information associated with the query.

In this way, by creating and using the information related to the search sequential order in the triple information storage unit 121A, the creating device 100 can reduce an increase in the processing time needed to specify one piece of triple information belonging to the circular linked list associated with the query and provide the triple information associated with the query without using the reference information in the reference information storage unit 122, the reference information storage unit 122A, or the like. Furthermore, the description above is an example and the creating device 100 creates information related to the search sequential order by appropriately using various kinds of information.

9. Effects

As described above, the creating device 100 according to the embodiment includes the acquiring unit 131 and the creating unit 132. The acquiring unit 131 acquires a plurality of pieces of triple information indicating the relationship related to three types of elements. The creating unit 132 creates association information that associates a triple information group having a predetermined relationship related to the three typed of elements from among the pieces of the triple information acquired by the acquiring unit 131.

Consequently, the creating device 100 according to the embodiment creates the association information that associates the triple information group having the predetermined relationship related to the three types of elements from among the pieces of the triple information, thereby enabling the triple information to be efficiently searched.

Furthermore, in the creating device 100 according to the embodiment, the creating unit 132 creates a plurality of pieces of association information associated with each of a plurality of combinations each of which includes one or more elements out of the three types of elements.

Consequently, the creating device 100 according to the embodiment creates the pieces of the association information associated with each of the combinations each of which includes one or more elements out of the three types of elements, thereby enabling the triple information to be efficiently searched.

Furthermore, in the creating device 100 according to the embodiment, the creating unit 132 creates, for each combination, a plurality of association information that associates the triple information groups in each of which the elements included in the combinations are associated.

Consequently, the creating device 100 according to the embodiment creates the pieces of the association information that associates the triple information groups in each of which the elements included in the combinations are associated, thereby enabling the triple information to be efficiently searched.

Furthermore, in the creating device 100 according to the embodiment, the creating unit 132 creates, for each triple information group, the information related to the circular linked list that connects the triple information included in the corresponding triple information groups.

Consequently, the creating device 100 according to the embodiment creates, for each triple information group, the information relates to the circular linked list that connects the triple information included in the corresponding triple information groups, thereby enabling the triple information to be efficiently searched.

Furthermore, in the creating device 100 according to the embodiment, the creating unit 132 creates the information related to the circular linked list by associating, for each triple information group, one of the pieces of the triple information included in the triple information groups with the other one of the pieces of the triple information included in the triple information groups.

Consequently, the creating device 100 according to the embodiment associates, for each triple information group, one of the pieces of the triple information included in the corresponding triple information groups with the other one of the pieces of the triple information included in the triple information groups, thereby enabling the triple information to be efficiently searched.

Furthermore, in the creating device 100 according to the embodiment, the creating unit 132 creates list information including information that specifies one piece of the triple information selected from each of the triple information groups.

Consequently, the creating device 100 according to the embodiment creates the list information including the information that specifies one piece of the triple information selected from each of the triple information groups, thereby enabling the triple information to be efficiently searched.

Furthermore, in the creating device 100 according to the embodiment, the creating unit 132 creates, as the list information, the information related to an associative array including entry information in which one piece of the triple information selected from each of the triple information groups is used as a key and the identification information of the selected triple information is used as a value.

Consequently, the creating device 100 according to the embodiment creates, as the list information, the information related to the associative array including the entry information in which one piece of the triple information selected from each of the triple information groups is used as a key and the identification information of the selected triple information is used as a value, thereby enabling the triple information to be efficiently searched.

Furthermore, in the creating device 100 according to the embodiment, the creating unit 132 creates the list information related to the triple information group except for the triple information groups associated with the combinations that include all of the three types of elements.

Consequently, the creating device 100 according to the embodiment creates the list information related to the triple information group except for the triple information groups associated with the combinations that include all of the three types of elements, thereby enabling the triple information to be efficiently searched.

Furthermore, in the creating device 100 according to the embodiment, the creating unit 132 creates the information related to a search order of each of the pieces of the triple information used at the time of searching the plurality of pieces of the triple information by sequentially determining, from the upper level, the order of the pieces of the triple information such that the triple information groups that include the pieces of the triple information whose order has been determined do not overlap.

Consequently, the creating device 100 according to the embodiment determines the information related to a search order of each of the pieces of the triple information used at the time of searching the plurality of pieces of the triple information and the order of the pieces of the triple information is sequentially determined from the upper level such that the triple information groups that include the pieces of the triple information whose order has been determined do not overlap, thereby enabling the triple information to be efficiently searched.

Furthermore, the creating device 100 according to the embodiment includes the extracting unit 133. The extracting unit 133 extracts a triple information group based on the designation related to one or more elements out of the three types of elements.

Consequently, the creating device 100 according to the embodiment extracts a triple information group based on the designation related to one or more elements out of the three types of elements, thereby enabling the triple information to be efficiently provided.

Furthermore, in the creating device 100 according to the embodiment, the acquiring unit 131 acquires the information related to the designation of one or more elements out of the three types of elements. The extracting unit 133 extracts the triple information group associated with the information related to the designation of the elements acquired by the acquiring unit 131.

Consequently, the creating device 100 according to the embodiment extracts the triple information group associated with the information related to the designation of the acquired elements, thereby enabling the triple information to be efficiently provided.

10. Hardware Configuration

The creating device 100 according to the embodiment described above is implemented by a computer 1000 having the configuration, for example, illustrated in FIG. 15. FIG. 15 is a block diagram illustrating an example of the hardware configuration of a computer that implements the function of the creating device. The computer 1000 includes a CPU 1100, RAM 1200, a read only memory (ROM) 1300, a hard disk drive (HDD) 1400, a communication interface (I/F) 1500, an input/output interface (I/F) 1600, and a media interface (I/F) 1700.

The CPU 1100 operates based on the programs stored in the ROM 1300 or the HDD 1400 and performs control of each of the units. The ROM 1300 stores therein a boot program executed by the CPU 1100 at the startup of the computer 1000, programs depending on the hardware of the computer 1000, or the like.

The HDD 1400 stores therein programs executed by the CPU 1100, data used by the programs, and the like. The communication interface 1500 receives data from another device via the network N, sends the data to the CPU 1100, and sends the data created by the CPU 1100 to the other devices via the network N.

The CPU 1100 controls, via the input/output interface 1600, an output device, such as a display, a printer, or the like, and an input device, such as a keyboard, a mouse, or the like. The CPU 1100 acquires data from the input device via the input/output interface 1600. Furthermore, the CPU 1100 outputs the created data to the output device via the input/output interface 1600.

The media interface 1700 reads a program or data stored in a recording medium 1800 and provides the program or the data to the CPU 1100 via the RAM 1200. The CPU 1100 loads the program into the RAM 1200 from the recording medium 1800 via the media interface 1700 and executes the loaded program. The recording medium 1800 is, for example, an optical recording medium, such as a digital versatile disc (DVD), a phase change rewritable disk (PD), or the like, a magneto optical recording medium, such as a magneto-optical disk (MO), or the like, a tape medium, a magnetic recording medium, a semiconductor memory, or the like.

For example, when the computer 1000 functions as the creating device 100 according to the embodiment, the CPU 1100 in the computer 1000 implements the function of the control unit 130 by executing the program loaded into the RAM 1200. The CPU 1100 in the computer 1000 reads and executes the programs from the recording medium 1800; however, as another example, the programs may also be acquired from another device via the network N.

11. Others

Of the processes described in the embodiment, the whole or a part of the processes that are mentioned as being automatically performed can also be manually performed, or the whole or a part of the processes that are mentioned as being manually performed can also be automatically performed using known methods. Furthermore, the flow of the processes, the specific names, and the information containing various kinds of data or parameters indicated in the above specification and drawings can be arbitrarily changed unless otherwise stated. For example, the various kinds of information illustrated in each of the drawings are not limited to the information illustrated in the drawings.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions.

Furthermore, the processes described in the embodiment may appropriately be combined as long as the processes do not conflict with each other.

Furthermore, the "components (sections, modules, units)" described above can be read as "means", "circuits", or the like. For example, an acquiring unit can be read as an acquiring means or an acquiring circuit.

According to an aspect of an embodiment, an advantage is provided in that it is possible to enable triple information to be efficiently searched.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A generating device comprising:
a processor programmed to:
  acquire a plurality of pieces of triple information indicating a relationship related to three types of elements, the elements comprising subject, predicate and object information; and
  generate, based on the pieces of the triple information acquired by the processor, association information that associates at least one piece of triple information with respect to another piece of triple information, the association information comprising a matrix of integers with a column corresponding to the subject information, a column corresponding to the predicate information, and a column corresponding to the object information, and a row corresponding to each piece of triple information,
wherein the matrix of integers includes a circular linked list that connects the triple information included in the pieces of triple information, the circular linked list comprising a subset of the integers in the matrix that each reference different pieces of triple information having a same subject, predicate, or object, and
the processor generates association information by associating, for each piece of triple information, one of the pieces of the triple information included in the pieces of triple information with another one of the pieces of the triple information included in the pieces of triple information.

2. The generating device according to claim 1, wherein the association information further comprises a column corresponding to a combination of the subject information and the predicate information, a column corresponding to a combination of the subject and object information, and a column corresponding to a combination of the predicate and object information.

3. The generating device according to claim 1, wherein the processor is further programmed to extract a piece of the triple information based on a designation related to one or more elements out of the three types of elements.

4. The generating device according to claim 3, wherein the processor is further programmed to acquire information related to the designation of one or more elements out of the three types of elements, and
the processor is further programmed to extract the piece of triple information associated with the information related to the designation of the elements acquired by the processor.

5. A generating device comprising:
a processor programmed to:
  acquire a plurality of pieces of triple information indicating a relationship related to three types of elements, the elements comprising subject, predicate and object information;
  generate, based on the pieces of the triple information acquired by the processor, association information that associates at least one piece of triple information with respect to another piece of triple information, the association information comprising a matrix of integers with a column corresponding to the subject information, a column corresponding to the predicate information, and a column corresponding to the object information, and a row corresponding to each piece of triple information;
  generate list information including information that specifies one piece of the triple information selected from each of the pieces of triple information; and
  generate, as the list information, the information related to an associative array including entry information in which one piece of the triple information selected from each of the pieces of triple information is used as a key and identification information of the selected triple information is used as a value,
wherein the matrix of integers includes a circular linked list that connects the triple information included in the pieces of triple information, the circular linked list comprising a subset of the integers in the matrix that each reference different pieces of triple information having a same subject, predicate, or object.

6. The generating device according to claim 5, wherein the processor generates the list information related to a piece of triple information except for the pieces of triple information associated with combinations that include all of the three types of elements.

7. A generating device comprising:
a processor programmed to:
  acquire a plurality of pieces of triple information indicating a relationship related to three types of elements, the elements comprising subject, predicate and object information;
  generate, based on the pieces of the triple information acquired by the processor, association information that associates at least one piece of triple information with respect to another piece of triple information, the association information comprising a matrix of integers with a column corresponding to the subject information, a column corresponding to the predicate information, and a column corresponding to the object information, and a row corresponding to each piece of triple information; and
  generate information related to a search order of each of the pieces of the triple information used at a time of searching the plurality of pieces of the triple information by sequentially determining, from an upper level, the order of the pieces of the triple information such that the pieces of triple information that include the triple information whose order has been determined do not overlap,
wherein to the matrix of integers includes a circular linked list that connects the triple information included in the pieces of triple information, the circular linked list comprising a subset of the integers in the matrix that each reference different pieces of triple information having a same subject, predicate, or object.

8. A generating method performed by a computer, the generating method comprising:
  acquiring a plurality of pieces of triple information indicating a relationship related to three types of elements, the elements comprising subject, predicate and object information; and
  generating, based on the pieces of the triple information acquired at the acquiring, association information that associates at least one piece of triple information with respect to another piece of triple information, the association information comprising a matrix of integers with a column corresponding to the subject information, a column corresponding to the predicate information, and a column corresponding to the object information, and a row corresponding to each piece of triple information,
wherein to the matrix of integers includes a circular linked list that connects the triple information included in the pieces of triple information, the circular linked list comprising a subset of the integers in the matrix that each reference different pieces of triple information having a same subject, predicate, or object, and
the generating includes generating the association information by associating, for each piece of triple information, one of the pieces of the triple information included in the pieces of triple information with another one of the pieces of the triple information included in the pieces of triple information.

9. A non-transitory computer-readable recording medium having stored therein a generating program that causes a computer to execute a process comprising:
  acquiring a plurality of pieces of triple information indicating a relationship related to three types of elements, the elements comprising subject, predicate and object information; and
  generating, based on the pieces of the triple information acquired at the acquiring, association information that associates at least one piece of triple information with respect to another piece of triple information, the association information comprising a matrix of integers with a column corresponding to the subject information, a column corresponding to the predicate information, and a column corresponding to the object information, and a row corresponding to each piece of triple information,
wherein matrix of integers includes a circular linked list that connects the triple information included in the pieces of triple information, the circular linked list comprising a subset of the integers in the matrix that each reference different pieces of triple information having a same subject, predicate, or object, and
the generating includes generating the association information by associating, for each piece of triple information, one of the pieces of the triple information included in the pieces of triple information with another one of the pieces of the triple information included in the pieces of triple information.

* * * * *